US008928580B2

(12) United States Patent
Hwang et al.

(10) Patent No.: US 8,928,580 B2
(45) Date of Patent: Jan. 6, 2015

(54) MOBILE TERMINAL

(75) Inventors: Yong Jin Hwang, Seoul (KR); Chang Bai Won, Suwon-si (KR); Bo Ra Choi, Seoul (KR); Kun Woo Lee, Anyany-si (KR); Luke Miles, London (GB); Yun Sung Lee, Seoul (KR); Gi Hoon Tho, Seoul (KR); Min Soo Kim, Seoul (KR); Yu Ri Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 12/907,841

(22) Filed: Oct. 19, 2010

(65) Prior Publication Data

US 2011/0095975 A1    Apr. 28, 2011

(30) Foreign Application Priority Data

Oct. 26, 2009   (KR) .................. 10-2009-0101709
Oct. 29, 2009   (KR) .................. 10-2009-0103587
Nov. 3, 2009    (KR) .................. 10-2009-0105297

(51) Int. Cl.
G09G 5/00       (2006.01)
G06F 1/16       (2006.01)
H04M 1/02       (2006.01)
G06F 3/01       (2006.01)
G06F 3/00       (2006.01)

(52) U.S. Cl.
CPC ........... H04M 1/0268 (2013.01); G06F 1/1626 (2013.01); G06F 3/016 (2013.01); H04M 2250/12 (2013.01); G06F 3/002 (2013.01)
USPC ....................................................... 345/156

(58) Field of Classification Search
USPC ........................................ 345/156, 176–184
See application file for complete search history.

(56) References Cited

U.S. PATENT DOCUMENTS

| 6,111,564 | A  | * | 8/2000  | Kanagawa ............... 345/173 |
| 7,196,689 | B2 | * | 3/2007  | Moriyama ............... 345/156 |
| 8,294,047 | B2 | * | 10/2012 | Westerman et al. ...... 178/18.03 |
| 8,405,605 | B2 | * | 3/2013  | Sugahara ............... 345/156 |
| 8,436,820 | B2 | * | 5/2013  | Jeong et al. ........... 345/173 |
| 8,654,075 | B2 | * | 2/2014  | Kim .................... 345/156 |
| 2004/0008191 | A1 | * | 1/2004 | Poupyrev et al. ........ 345/184 |
| 2007/0171212 | A1 | * | 7/2007 | Sakurai et al. ......... 345/177 |
| 2009/0088220 | A1 |   | 4/2009 | Persson |
| 2009/0219247 | A1 | * | 9/2009 | Watanabe et al. ........ 345/157 |
| 2011/0095975 | A1 | * | 4/2011 | Hwang et al. .......... 345/156 |

FOREIGN PATENT DOCUMENTS

| CN | 101059950   | 10/2007 |
| CN | 101403839   | 4/2009  |
| WO | 01/91100    | 11/2001 |
| WO | 2009/009327 | 1/2009  |

OTHER PUBLICATIONS

State Intellectual Property Office of the People's Republic of China Application Serial No. 201010524448.5, Office Action dated Mar. 12, 2013, 6 pages.
European Patent Office Application Serial No. 10013507.8, Office Action dated Oct. 22, 2014, 5 pages.

* cited by examiner

*Primary Examiner* — Christopher E Leiby
(74) *Attorney, Agent, or Firm* — Lee, Hong, Degerman, Kang & Waimey

(57) ABSTRACT

A mobile terminal includes a body including a flexible portion, a display unit provided to the body, a sensing unit provided to the body and generating an electric signal in response to bending of the body, and a controller recognizing the electric signal and controlling the display unit according to the electric signal generated by the bending of the body.

16 Claims, 24 Drawing Sheets

(a)

(b)

(a)

(b)

(a)

(b)

(a)

(b)

(a)          (b)

(a)

(b)

(a)

(b)

(a)

(b)

MOBILE TERMINAL

CROSS REFERENCE TO RELATED APPLICATION

Pursuant to 35 U.S.C. §119(a), this application claims the benefit of earlier filing date and right of priority to Korean Patent Application Nos. 10-2009-0101709, filed on Oct. 26, 2009, 10-2009-0103587, filed on Oct. 29, 2009 and 10-2009-0105297, filed on Nov. 3, 2009, the contents of which are hereby incorporated by reference in their entirety.

FIELD OF THE DISCLOSURE

The present invention relates to a flexible or bendable mobile terminal. An input may be received by the mobile terminal in response to the bending of the mobile terminal or the mobile terminal may output a notification signal by being bent.

DISCUSSION OF THE RELATED ART

A mobile terminal may be configured to perform various functions such as data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents such as videos and television programs.

Generally, terminals can be classified into mobile terminals and stationary terminals according to their mobility. The mobile terminals can be further classified into handheld terminals and vehicle mountable terminals according to their mode of portability.

There are ongoing efforts to support and increase the functionality of mobile terminals. Such efforts include software and hardware improvements, as well as changes and improvements in the structural components which form the mobile terminal.

Moreover, the mobile terminal is considered as a personal portable device, and may have a two sided LCD (liquid crystal display) having view windows on both sides of a body, a flexible display, a full face touch screen, and so on. Recently, in response to demands on the mobile terminal which is light, thin, short and small, a touch screen system is becoming popular while a key pad is removed from some mobile terminals.

However, it may be difficult to receive user input via the mobile terminal having a touch screen type display if the display is deactivated according to a setting. On the other hand, if an additional key pad is provided on the mobile terminal, the additional key pad may negatively affect the outer appearance of the terminal body, and thus, such a configuration of the mobile terminal may not be desired.

A related art mobile terminal displays processed information or an outcome of an electric signal on a display unit thereof or transmits the same to the user via sound or vibration. However, when an output signal from the terminal is transmitted through the display unit, a problem may occur in that the output information is not transmitted to the user directly unless the user continues to look at the display unit. Moreover, the transmission of the output signal from the terminal to the user via sound or vibration may not be desirable in a public space because such an output may annoy others in the same space.

SUMMARY OF THE DISCLOSURE

Accordingly, the present invention is directed to a mobile terminal.

An object of the present invention is to provide a mobile terminal which can generate various user input signals by physical deformation of a body thereof.

Another object of the present invention is to provide a mobile terminal which can sense and convert a pressure caused by bending of a body thereof into a user input signal.

Yet another object of the present invention is to provide a mobile terminal which can sense and convert a relative position change of different parts caused by bending of a body thereof into a user input signal.

Further object of the present invention is to provide a mobile terminal a body shape of which is physically deformed by an electric signal or the like.

Still further object of the present invention is to provide a mobile terminal which can transmit an output signal by being deformed or changing a shape of a body thereof.

According to an embodiment of the present invention, a mobile terminal includes a body including a flexible portion, a display unit provided to the body, a sensing unit provided to the body and generating an electric signal in response to bending of the body, and a controller recognizing the electric signal and controlling the display unit according to the electric signal generated by the bending of the body.

According to another embodiment of the present invention, a mobile terminal includes a body including a flexible portion, a controller outputting a notification signal for notifying an event, and an actuator changing a shape of the body in response to a signal received from the controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to various types of terminals. Examples of such terminals include mobile as well as stationary terminals, such as mobile phones, user equipment, smart phones, digital televisions (DTVs), computers, digital broadcast terminals, personal digital assistants, portable multimedia players (PMPs) and navigators.

However, by way of non-limiting example only, further description will be with regard to a mobile terminal 100, and it should be noted that such teachings may apply equally to other types of terminals.

Figure 1:
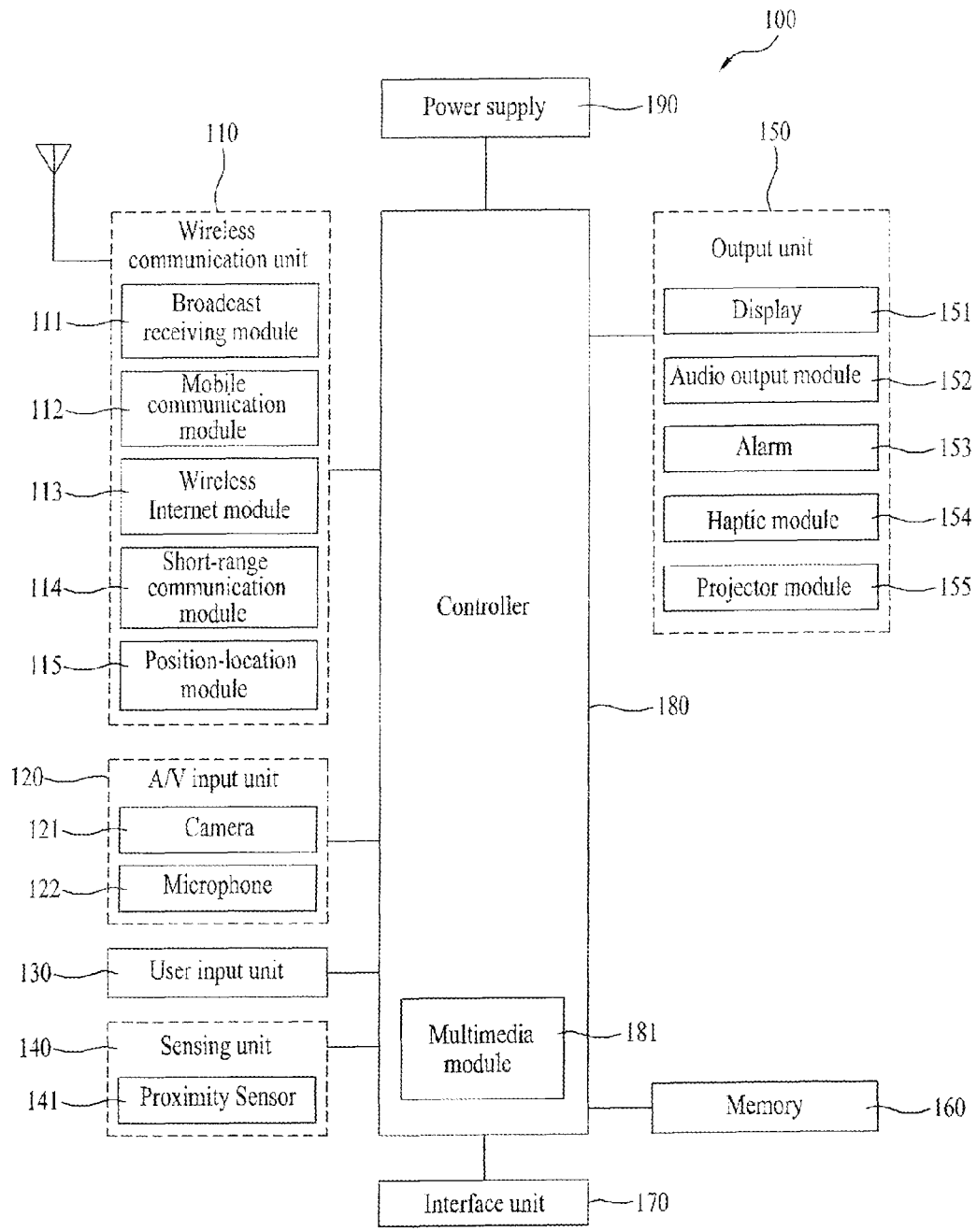
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wired communication unit. The wireless communication unit 110 and wired communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous reception of at least two broadcast channels or facilitate broadcast channel switching.

Examples of broadcast associated information include information associated with a broadcast channel, a broadcast program, or a broadcast service provider. For example, the broadcast associated information may include an electronic program guide (EPG) of a digital multimedia broadcasting (DMB) system and an electronic service guide (ESG) of a digital video broadcast-handheld (DVB-H) system.

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include a digital multimedia broadcasting-terrestrial (DMB-T) system, a digital multimedia broadcasting-satellite (DMB-S) system, a digital video broadcast-handheld (DVB-H) system, the data broadcasting system known as media forward link only (MediaFLO®) and an integrated services digital broadcast-terrestrial (ISDB-T) system.

Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless Internet module 113 supports Internet access for the mobile terminal 100. This module may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module 113 can be replaced with a wire Internet module in non-mobile terminals. The wireless Internet module 113 and wired Internet module may be commonly referred to as an Internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth® and ZigBee®.

A position-location module 115 identifies or otherwise obtains the location of the mobile terminal 100. This module may be implemented using, for example, global positioning system (GPS) components which cooperate with associated satellites, network components, or combinations thereof.

According to the current technology, the position-location module 115 is able to precisely calculate current three-dimensional position information based on longitude, latitude and altitude by calculating distance information and precise time information from at least three satellites and then applying triangulation to the calculated information. Currently, location and time information is calculated using three satellites, and errors of the calculated location position and time information are then amended using another satellite. The position-location module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video. A microphone 122 receives an external audio signal while the mobile terminal 100 is in a particular mode, such as a phone call mode, recording mode or voice recognition mode. This audio signal is processed and converted into digital data.

The mobile terminal 100, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones 122 and/or cameras 121 may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display 151, which will be described in more detail below.

A sensing unit 140 provides status measurements of various aspects of the mobile terminal 100. For example, the sensing unit 140 may detect an open/close status of the mobile terminal 100, relative positioning of components such as a display 151 and keypad of the mobile terminal, a change of position of the mobile terminal or a component of the mobile terminal, a presence or absence of user contact with the mobile terminal, or orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal 100 with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card.

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface (UI) or graphical user interface (GUI) that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays 151 can be configured transparent so that an external environment can be seen through the corresponding display. Such a display 151 can be called a transparent display. A representative example of the transparent display is a transparent LCD display.

The mobile terminal 100 may include one or more of displays 151. An example of a two-display embodiment is one in which one display 151 is configured as an internal display viewable when the mobile terminal is in an opened position and a second display 151 is configured as an external display viewable in both the opened and closed positions. The touchscreen can be configured to detect a touch input pressure as well as a touch input position and size.

Meanwhile, a proximity sensor 141 can be provided within or around the touchscreen. The proximity sensor 141 detects an object approaching a prescribed detecting surface or a presence or non-presence of an object existing around itself using an electromagnetic power or infrared rays without mechanical contact. Hence, the proximity sensor 141 may be superior to a contact sensor with regard to lifespan and utilization.

An example of an operation of the proximity sensor 141 will be explained as follows. First, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. Thus, if any material other than a metal comes between the RF oscillation proximity sensor and the object, a proximity switch will be able to detect the object without interference by the material.

Even without providing the proximity sensor 141, if the touchscreen is electrostatic, it can be configured to detect the proximity of a pointer through an electric field change attributed to the proximity of the pointer. Therefore, when the pointer is placed in the vicinity of the touchscreen without actually contacting the touchscreen, to the touchscreen can detect a position of the pointer and a distance between the pointer and the touchscreen. For clarity and convenience of explanation, an action for enabling the pointer approaching the touchscreen to be recognized as placed on the touchscreen is named a 'proximity touch' and an action of enabling the pointer to actually contact the touchscreen is named a 'contact touch'. And, a position, at which the proximity touch is performed on the touchscreen using the pointer, refers to a position of the pointer vertically corresponding to the touchscreen when the pointer performs the proximity touch.

If the proximity sensor 141 is used, it is able to sense a proximity touch and its pattern (e.g., proximity touch distance, proximity touch direction, proximity touch speed, proximity touch position, or proximity touch moving state). The proximity sensor 141 is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as a call-receiving mode, call-placing mode, recording mode, voice recognition mode and broadcast reception mode. During operation, the audio output module 152 outputs audio related to a particular function or status, such as a call received, message received, or errors.

The output unit 150 is further shown having an alarm 153, which is commonly used to signal or otherwise identify the occurrence of a particular event associated with the mobile terminal 100. Typical events include a call received, message received and user input received.

An example of a signal provided by the output unit 150 are tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of the output unit 150 may be separately performed or performed using any combination of such components.

The memory 160 is generally used to store various types of data to support the process, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160. Map information can also be stored in the memory 160, and therefore promote a user's convenience by providing the map information to the user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communication, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply 190 provides power required by the various components of the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a bar-type mobile terminal 100. However such teachings apply equally to other types of mobile terminals.

Figure 2:
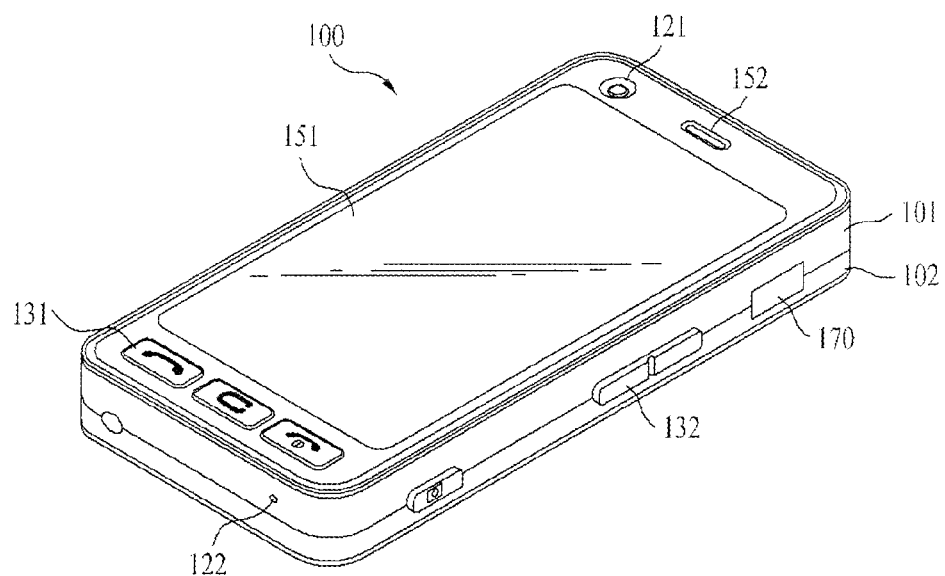
FIG. 2 is a frontal perspective view of a mobile terminal related to an embodiment of the present invention.

Referring to FIG. 2, the mobile terminal 100 includes a bar shaped terminal body. However, the present invention is not limited to this configuration, but is applicable to terminals of various structures, such as a slide type in which two or more bodies are coupled so as to be movable to one another relatively, a folder type, a swing type, a swivel type, and so on.

The body includes a case (casing, housing, or cover) which forms an exterior thereof. In the embodiment, the case includes a front case 101 and a rear case 102. Various electronic components are mounted in a space formed between the front case 101 and the rear case 102. There can be at least one intermediate case between the front case 101 and the rear case 102, additionally. The cases may be injection moldings of synthetic resin or formed of a metal, such as stainless steel or titanium Ti.

The terminal body, mostly the front case 101, may have a display 151, an audio output module 152, a camera 121, user input units 130 including inputs 131 and 132, a microphone 122, and an interface unit 170 arranged thereon.

The display 151 occupies most of a main surface of the front case 101. The audio output module 152 and the camera 121 are arranged at a region adjacent to one end of the display 151 and the user input unit 132 and the microphone 122 are arranged at a region adjacent to the other end of the display 151. The user input unit 132 and the interface 170 may be arranged at sides of the front case 101 and the rear case 102.

The user input unit 130, for receiving an order to control operation of the mobile terminal 100, may include a plurality of handling units 131 and 132. The handling units 131 and 132 may be called a handling portion collectively, which may be of any type as long as it can be handled in a tactile manner.

Contents to be received by the first and second handling units 131 and 132 may be set in a variety of ways. For example, the first handling unit 131 may receive orders, such as start, end and scroll, and the second handling unit 132 may receive orders, such as control of sound volume from the audio output module 152, and shifting to a touch sensing mode of the display 151, and so on.

Figure 3:
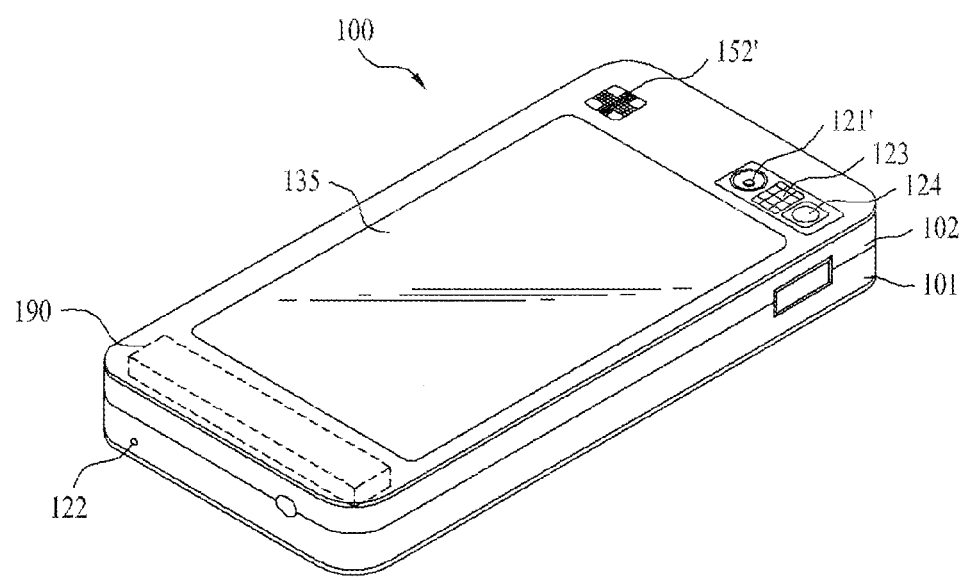
FIG. 3 is a backside perspective view of the mobile terminal shown in FIG. 2.

Referring to FIG. 3, an additional camera 121' may be mounted to a backside of the terminal body, i.e., on the rear case 102. The camera 121' has a picture taking direction opposite to the camera 121 shown in FIG. 2, and may have a pixel resolution different from the camera 121.

For an example, it is preferable that the camera 121 has a low density of pixels such that taking a picture of a user's face and transmitting the picture to a receiver can be done conveniently. The camera 121' may have a high density of pixels such that the camera 121' photograph a general object and store a higher quality picture. The cameras 121 and 121' may be mounted to the terminal body rotatably or with the ability to pop-up.

A flash 123 and a mirror 124 are also arranged adjacent to the camera 121'. The flash 123 illuminates the object when the camera 121' photographs the object. The mirror 124 enables the user to see the user's face if the user intends to take a picture of the user with the camera 121'.

An additional audio output module 152' may be mounted to the backside of the terminal body. The audio output module 152' can implement a stereo function together with the audio output module 152 shown in FIG. 2A, and may be used for implementing a speaker phone mode.

Besides an antenna for communication, the terminal body at a side thereof may also have a broadcasting signal reception antenna 124. The antenna 124 in the broadcast receiving module 111 shown in FIG. 1 may be mounted such that it can be pulled out of the terminal body.

The terminal body has the power supply unit 190 mounted thereto for supplying power to the mobile terminal 100. The power supply unit 190 may be built in the terminal body or detachably mounted to an outer surface of the terminal body.

The rear case 102 may have a touch pad 135 mounted thereto for sensing a touch. Similar to the display 151, the touch pad 135 may also be a light transmissive. For example, if the display 151 is configured to provide visual information on both sides of the display such that the visual information is viewable on both the front case 101 and the rear case 102, the visual information can also be sensed and controlled by the touch pad 135. Alternatively, an additional display 151 may be mounted to the touch pad 135 such that an additional touch screen is provided on the rear case 102.

The touch pad 135 is operative in relation to the display 151 on the front case 101. The touch pad 135 can be arranged at the rear of the display 151 in parallel thereto. The touch pad 135 may have a size which is the same or smaller than the display 151.

Figure 4:
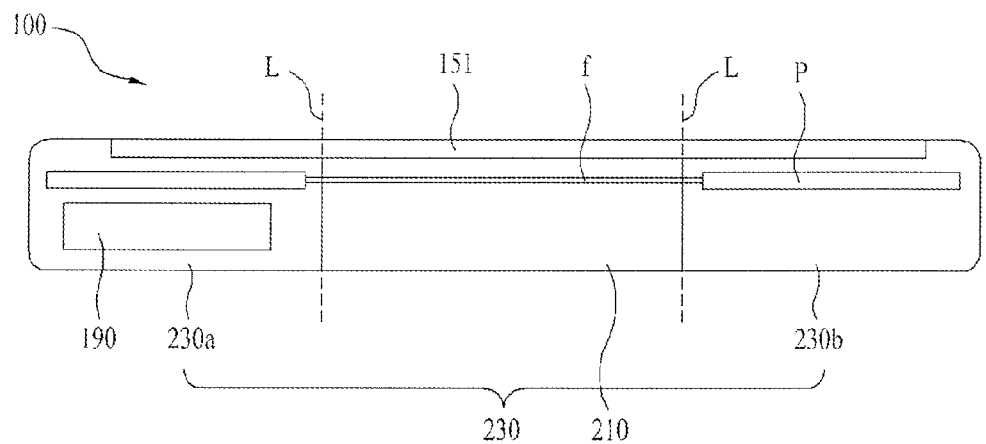
FIGS. 4(*a*) and 4(*b*) are schematic views of a mobile terminal having a body including several sections in accordance with an embodiment of the present invention, wherein the configuration of the body can be changed.
Figure 4:
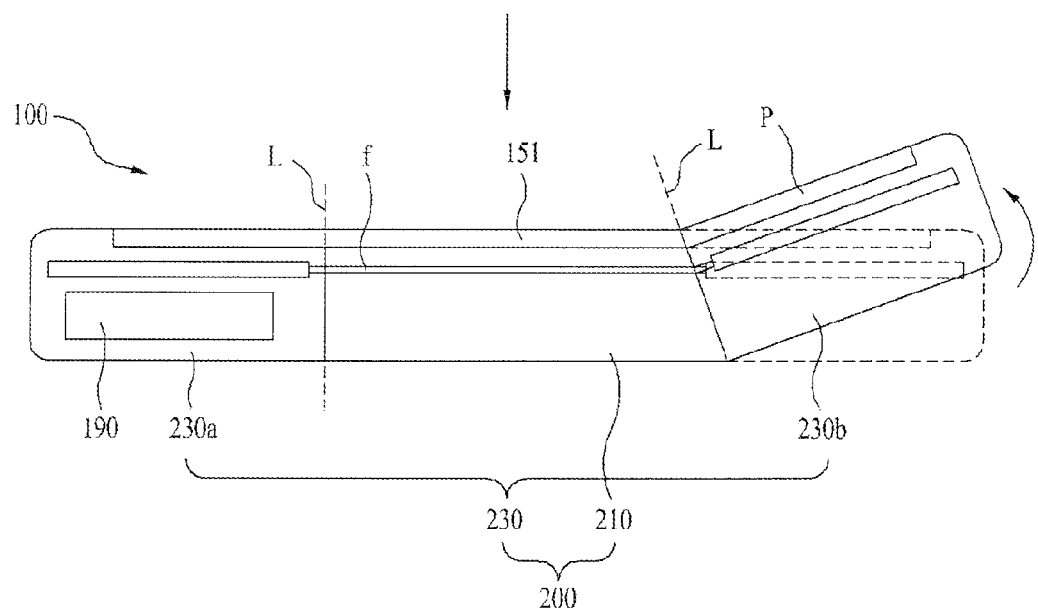
Figure 5:
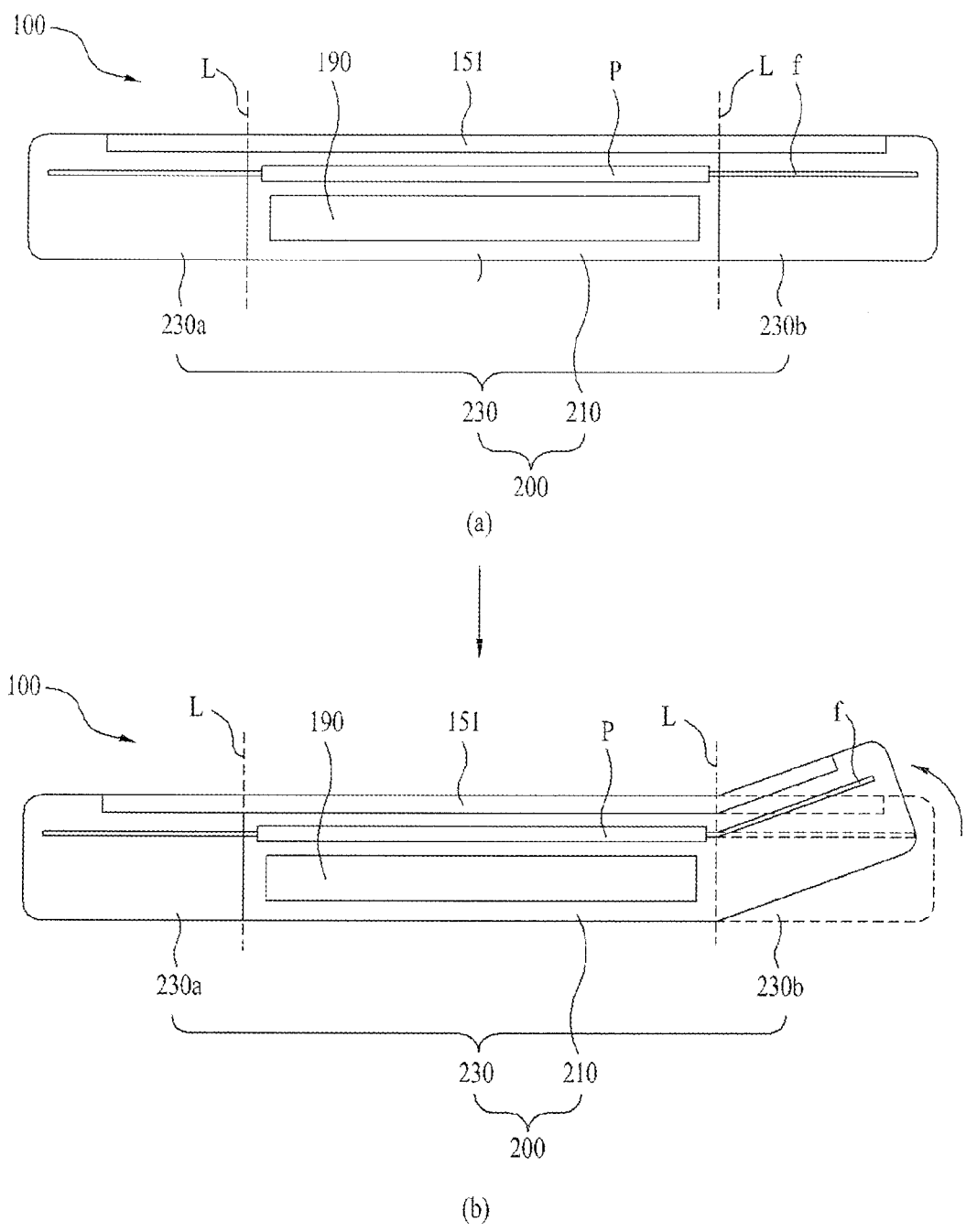
FIGS. 5(*a*) and 5(*b*) are schematic views of a mobile terminal having a body including several sections in accordance with another embodiment of the present invention, wherein the configuration of the body can be changed.

Referring to FIGS. 4 and 5, the mobile terminal 100 includes a body 200 of which at least a portion is formed of an elastic material that allows deformation of the body, a display 151 provided to the body 200, and at least one sensing unit 500 (discussed below referring to FIGS. 6 to 9) provided on the body 200, which transmits an electric signal generated in response to a change in the body configuration or according to an extent the body 200 is bent.

The display 151 is constructed of a flexible display which can be bent in accordance with the bending of the body 200. The flexible display has a flexible screen which can be rolled at the end, and is configured to be flexible or bendable such that the display 151 can be folded or unfolded.

A general printed circuit board P and a flexible printed circuit board f can be mounted in the body 200, selectively. That is, the flexible printed circuit board f is provided at a flexible portion of the body 200 formed of the flexible material, and the printed circuit board P is provided at a rigid portion of the body 200 formed of a rigid material. The flexible printed circuit board f is arranged at a boundary of the flexible portion and the rigid portion.

The printed circuit board P may be a plate having thin copper lines printed thereon, and is an electronic component formed to place different components, such as semiconductors, condensers, or resistors, therein. This enables effective electric wiring design to reduce a size of electronic apparatuses and enhance performance thereof. Even though a general printed circuit board P is constructed of a solid board that is rigid, since the flexible printed circuit board f is constructed of a flexible board that can be bent, the flexible printed circuit board f is suitable for a bendable structure.

In one embodiment, although the body 200 has frames built in the front and rear cases 101 and 102, the body 200 is not distinctive from the front and rear cases 101 and 102. That is, the body 200 is formed as a single structure of the mobile terminal 100 including the front and rear cases 101 and 102, and the frames that form an inside structure of the front and rear cases 101 and 102.

Since the body 200 is flexible, when at least some portions of the body 200 are formed of an elastic material and exposed to an outside of the body 200, or separate front and rear cases 101 and 102 are provided according to the design, the front and rear cases 101 and 102 also are formed of the identical elastic material that forms the body 200 such that an exterior of the mobile terminal 100 can be deformed or bent physically.

The body 200 may include a first body 210 and at least one second body 230a/230b flexibly coupled to the first body 210. In this embodiment, although the second body 230 may include a second body 230a provided at one side of the first body 210, and a second body 230b provided at the other side of the first body 210, the second bodies 230a and 230b are identical in their structure and function.

In this embodiment, one of the first body 210 and the second body 230a/230b is formed of a flexible material, and the other is formed of a rigid material. For example, if the first body 210 is formed of the flexible material, the second body 230a/230b is formed of the rigid material, or depending on the design, both the first body 210 and the second body 230a/230b may be formed as a single unit of the flexible material.

A preferred embodiment of the body 200 will be described with reference to FIGS. 4(a) and 4(b). The first body 210 may be formed of the flexible material, and the second body 230a/230b may be formed of the rigid material. In this embodiment, the flexible printed circuit board f is provided to the first body 210, and the printed circuit board P and a battery 190 may be provided to the second body 230a/230b. That is, the flexible printed circuit board f that is suitable for bending is applied to the first body 210 while the printed circuit board P that is not bendable or rigid and the battery 190 that requires security are applied to the second body 230a/230b.

In this embodiment, the display 151 constructed of the flexible display is arranged at one side of the body 200. The display 151 may be provided to both the first body 210 and the second body 230a/230b, or depending on the design, the display 151 may be provided only to the first body 210 or the second body 230a/230b. When the first body 210 is formed of the flexible material, if an external force is applied to the second body 230, the first body 210 is deformed elastically to guide relative movement of the second body 230a/230b, as shown in FIG. 4(b).

A body 200 in accordance with another embodiment of the present invention will be described with reference to FIGS. 5(a) and 5(b). The first body 210 may be formed of the rigid material and the second body 230a/230b may be formed of the flexible material. In this embodiment, the printed circuit board P and the battery 190 are provided to the first body 210 and the flexible printed circuit board f is provided to the second body 230a/230b.

When the second body 230a/230b is formed of the flexible material, if external force is applied to the second body 230a/230b, the second body 230a/230b is deformed elastically such that the second body 230a/230b moves, rotates, or bends relative to the first body 210, as shown in FIG. 5(b). As discussed referring to FIGS. 5(a)-6(b), the materials used for the first body 210 and the second body 230a/230b may vary in the mobile terminal 100 depending on their arrangement.

Figure 6:
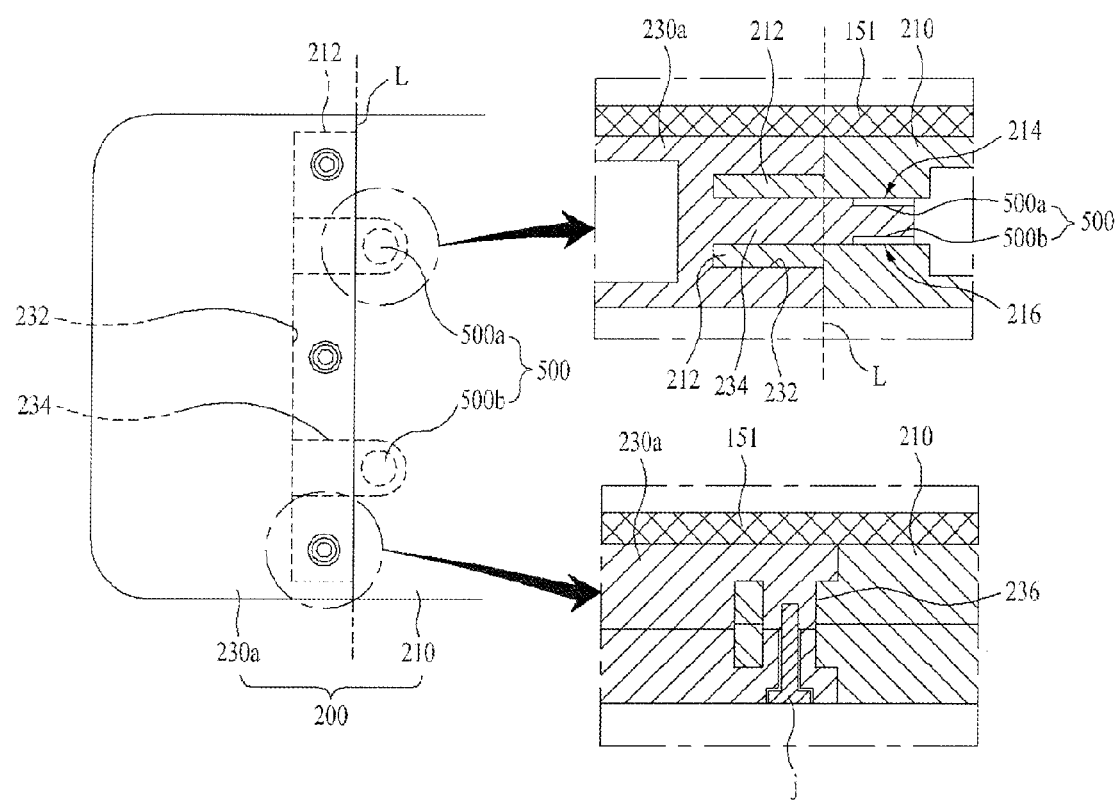
FIG. 6 is a schematic view of sections of a body of a mobile terminal in accordance with an embodiment of the present invention, the body including a plurality of coupling structures.
Figure 7:
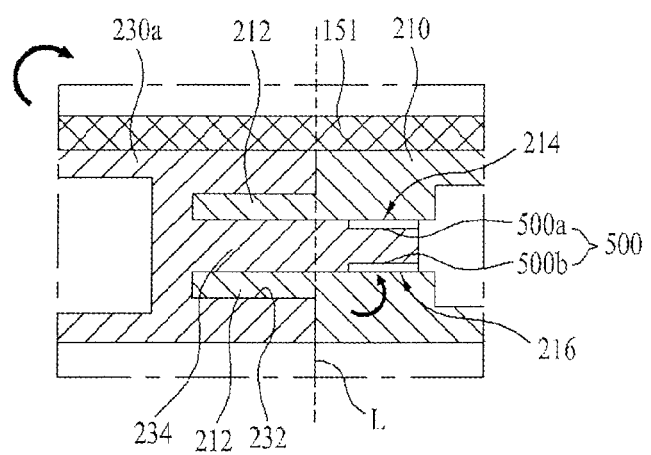
FIGS. 7(a) and 7(b) are schematic views of sections showing pressure sensing positions caused by a change in the body configuration of a mobile terminal in accordance with an embodiment of the present invention.
Figure 7:
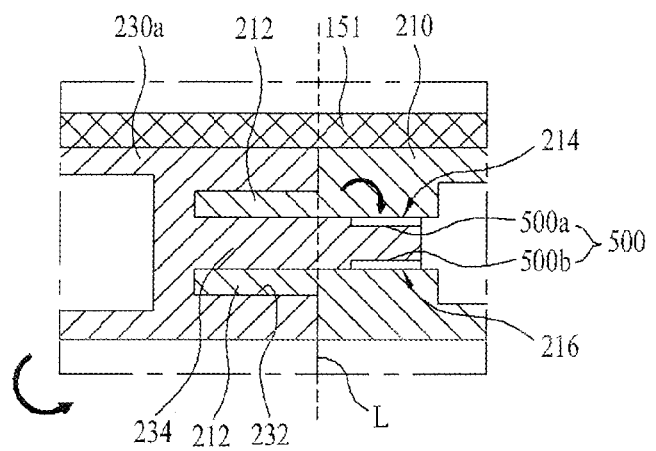

Referring to FIGS. 6, 7(a) and 7(b), both the first body 210 and the second body 230a are bendable. In this embodiment, the first body 210 is formed of the flexible material and the second body 230 is formed of the rigid material.

The first body 210 and the second body 230a have a coupling rib 212 and a coupling slot 232, respectively. The coupling slot 232 extends along a coupling surface L of the first body 210 and the second body 230a, and the coupling rib 212 is placed in the coupling slot 232 to couple the first and second bodies 210 and 230a together.

A sensing unit 500 is included at a coupling portion of the first body 210 and the second body 230a. The sensing unit 500 may be the sensing unit 140 and may sense pressure applied thereto. The sensing unit 500 may include a first sensing unit 500a and a second sensing unit 500b.

The first body 210 may comprise the coupling rib 212 to be placed in the second body 230a. The coupling rib 212 is extended along the coupling surface L of the first body 210 and the second body 230a. That is, the coupling rib 212 is projected toward the second body 230a along one side circumference of the first body 210.

The first body 210 includes contact portions 214 and 216 to be brought into contact with the sensing unit 500 to apply a pressure thereto. The same number of the contact portions 214 and 216 and the sensing units 500 are provided.

The contact portions 214 and 216 may be a portion of the first body 210 or the coupling rib 212, and may not be distinctive from the first body 210 or the coupling rib 212. However, the contact portions 214 and 216 may have shapes and structures that are different from the first body 210 or the coupling rib 212, respectively.

The contact portions 214 and 216 may include a first contact portion 214 and a second contact portion 216 matching the first sensing unit 500a and the second sensing unit 500b, respectively. The first contact portion 214 and the second contact portion 216 are provided independently from each other to prevent the contact portions 214 and 216 from interfering with each other due to physical deformation.

The second body 230a includes a coupling slot 232 formed therein for placing the coupling rib 212 therein. The coupling slot 232 is formed as a portion of the second body 230a and recessed inward. It is preferable that the coupling rib 212 and the coupling slot 232 are not exposed to an exterior of the mobile terminal 100 at the time of coupling.

A mounting rib 234 may be provided to the first body 210 or the second body 230a. The mounting rib 234 has the sensing unit 500 provided thereto. In this embodiment, the mounting rib 234 is provided to the second body 230 to match the coupling rib 212. While the coupling rib 212 is projected toward the second body 230a from the contact surface L, the mounting rib 234 is projected toward the first body 210 from the contact surface L, which strengthens the coupling of the first body 210 and the second body 230a.

The body 200 has a fastening boss 236 provided thereto such that the fastening boss 236 passes through the coupling rib 212 in the coupling slot 232 at the first body 210 or the second body 230a. The fastening boss 236 may be provided at a portion where the coupling slot 232 is formed therein. In order to maintain a constant fastening force, it is preferable that at least two fastening bosses 236 are arranged such that they are spaced apart from each other.

At least two fastening bosses 236 may be provided spaced apart from each other and a coupling force thereof may be maintained by a fastening piece j that passes through the fastening bosses 236. However, depending on the design, the first body 210 and the second body 230 may be coupled, not by the fastening bosses 236, but by the fastening piece j which passes through the first body 210 and the second body 230.

Even though the sensing unit 500 is provided to a fore end of the mounting rib 234 and mounted to the second body 230a, the sensing unit 500 may be positioned at the first body 210. The sensing unit 500 is preferably positioned at the first body 210 because the flexible-material composition of the first body 210 prevents damage to the sensing unit 500 such that the sensing unit 500 can effectively sense a signal.

Moreover, the sensing unit 500, provided at the contact surface of the first body 210 and the second body 230a, is configured to forward an electric signal which may vary with the extent of contact between the first body 210 and the second body 230a.

Preferably, the sensing unit 500 is mounted to the second body 230a formed of the rigid material for sensing the extent of contact of the second body 230a to the first body 210 formed of the flexible material. The sensing unit 500 includes one pair of the first sensing unit 500a and the second sensing unit 500b provided in a height direction of the body 200 such that they are spaced apart from each other.

Thus, the one pair of the first sensing unit 500a and the second sensing unit 500b sense pressure changes of respective positions and transmit an electric signal to the controller 180. The controller 180 determines a direction of bending of the body 200 and recognizes the bending as a user's input signal according to a setting registered in advance.

The sensing unit 500 may be extended in a length direction of the body 200. This is because the coupling between the first body 210 and the second body 230a is made in the length direction. That is, when the first body 210 or the second body 230a is bent, since deformation of the mounting rib 234 or the coupling rib 212 takes places in the height direction of the body 200, the sensing unit 500 is extended in the length direction of the body 200 for easy sensing of the bending. In this embodiment, the sensing unit 500 is positioned between the one pair of coupling ribs 212.

Preferably, a plurality of the sensing units 500 are provided to corners of the body 200 spaced apart from each other. The sensing units 500 may be arranged at a plurality of corners to enable the user to receive a desired signal at various portions of the mobile terminal 100.

The sensing unit 500 may include a proximity sensor 141, a pressure sensor, or an acceleration sensor. The proximity sensor 141 enables the mobile terminal 100 to detect an approaching object or existence of an object close thereto without actual physical contact. The proximity sensor 141 can detect the object positioned close thereto by detecting a change of an AC magnetic field, a change of a static magnetic field, or a rate of change of capacitance. Two or more proximity sensors 141 can be provided depending on the configuration of the mobile terminal 100.

The pressure sensor can detect application of pressure to the mobile terminal 100 and intensity of the pressure. The pressure sensor can be mounted to a portion of the mobile terminal 100 where detection of pressure is required.

The acceleration sensor is a device for converting a change of directional acceleration to an electric signal, and is widely used in micro-electromechanical systems (MEMS). There are various kinds of acceleration sensors, including one that is built into an air bag system of a car to measure a high acceleration for detecting collision, and one that measures micron acceleration used as input means of a game device by sensing a minute action of a human hand. In general, although the acceleration sensor has two axes or three axes mounted to one package, only one axis or Z-axis may be required.

Accordingly, instead of the Z-axis acceleration sensor, if an X-axis or a Y-axis acceleration sensor is required under a certain circumstance, the acceleration sensor may be mounted vertically to a main board by using a separate board piece.

Moreover, the sensing unit 500 includes at least one of a motion sensor, a temperature sensor, a tension sensor, a current sensor, a touch sensor, a tilt sensor for detecting folding or bending of the body 200 or detecting folding or bending of a portion thereof.

In this embodiment, the sensing unit 500 is the pressure sensor for measuring an absolute pressure or a relative pressure changed in response to bending of the body 200.

Referring to FIG. 7(a), when the second body 230a is bent upward in the same direction as a screen of the display 151 faces, the second contact portion 216 is deformed to apply pressure to the second sensing unit 500b, and the body 200 receives a user input signal.

In contrast, referring to FIG. 7(b), when the second body 230a is bent downward in a direction that is opposite to a direction the screen of the display 151 faces, the first contact portion 214 is deformed to apply pressure to the first sensing unit 500a, and the body 200 receives the user input signal.

A coupling structure of the first body 210 and the second body 230a and the arrangement of the sensing units 500 may vary depending on design. In the description of other embodiments of the present invention, detailed description of parts that are identical to the foregoing embodiment will be omitted.

Figure 8:
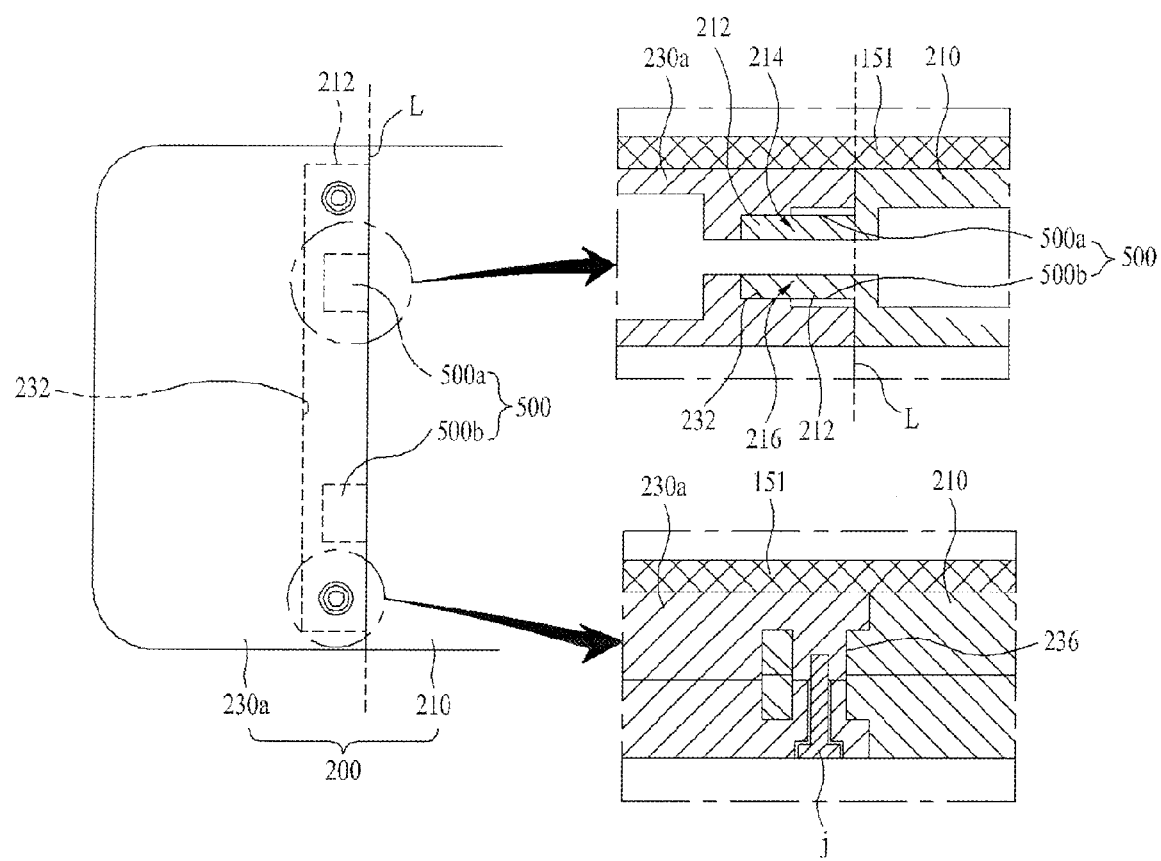
FIG. 8 is a schematic view of sections showing a plurality of coupling structures in a body of a mobile terminal in accordance with another embodiment of the present invention.
Figure 9:
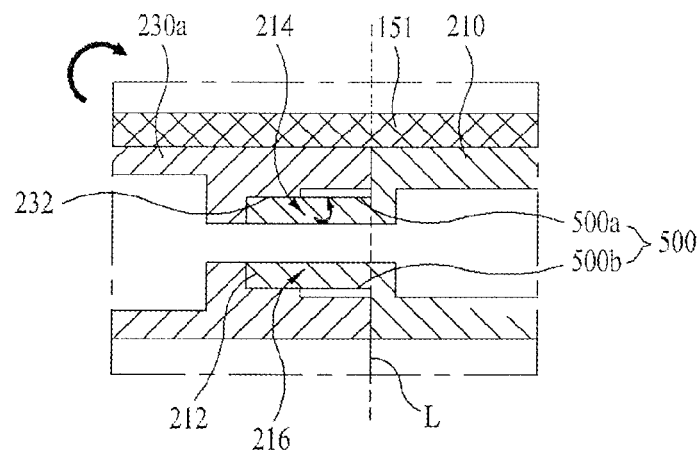
FIGS. 9(a) and 9(b) are schematic views of sections showing pressure sensing positions caused by a change in the body configuration of a mobile terminal in accordance with yet another embodiment of the present invention.
Figure 9:
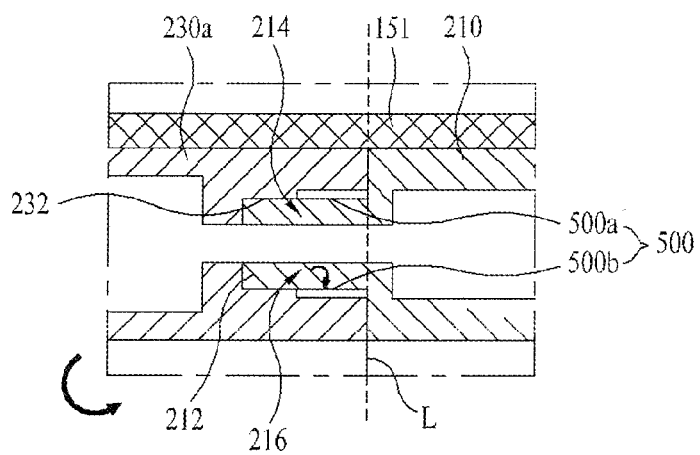

Referring to FIGS. 8, 9(a), and 9(b), at least one of the first body 210 and the second body 230a is bendable. For example, the first body 210 is formed of a flexible material and the second body 230a is formed of a rigid material.

The first body 210 and the second body 230a have a coupling rib 212 and a coupling slot 232, respectively. The coupling slot 232 extends along a coupling surface L of the first body 210 and the second body 230a, and the coupling rib 212 is placed in the coupling slot 232 to couple the first and second bodies 210 and 230a together.

A sensing unit 500 is located between the first body 210 and the second body 230a. The sensing unit 500 may include a first sensing unit 500a and a second sensing unit 500b.

The first body 210 may include the coupling rib 212 to be placed in the second body 230a. The coupling rib 212 is extended along the coupling surface L of the first body 210 and the second body 230a. That is, the coupling rib 212 is projected toward the second body 230a along one side circumference of the first body 210.

The first body 210 includes contact portions 214 and 216 to be brought into contact with the sensing unit 500 to apply pressure thereto. The same number of the contact portions 214 and 216 and the sensing units 500 are provided. The contact portions 214 and 216 may include a first contact portion 214 and a second contact portion 216 matching the first sensing unit 500a and the second sensing unit 500b, respectively. In this embodiment, the contact portions 214 and 216 may be a portion of the coupling rib 212.

The body 200 includes a fastening boss 236 provided thereto such that the fastening boss 236 passes through the coupling rib 212 that is placed in the coupling slot 232 from the first body 210 or the second body 230a. At least two fastening bosses 236 may be provided such that they are spaced apart from each other, and the fastening force may be maintained by a fastening piece j that passes through the fastening bosses 236.

The sensing unit 500 is provided to a fore end of the coupling slot 232 and mounted to the second body 230a. In this embodiment, the sensing unit 500 is arranged on a side of the second body 230a with reference to the contact surface L of the first body 210 and the second body 230a.

Preferably, the sensing unit 500 is mounted to the second body 230a formed of the rigid material for sensing the extent of contact of the second body 230a to the first body 210 formed of the flexible material. In this embodiment, the sensing unit 500 is provided to receive pressure from a portion of the coupling rib 212 of the first body 210, selectively. One pair of the coupling ribs 212 is formed between the first sensing unit 500a and the second sensing unit 500b. In other words, the sensing unit 500 is provided between the coupling slot 232 and the coupling rib 212.

The sensing unit 500 includes one pair of the first sensing unit 500a and the second sensing unit 500b provided in a height direction of the body 200 such that they are spaced apart from each other. The sensing unit 500 may be extended in a length direction of the body 200. It is preferable that a plurality of the sensing units 500 are provided to corners of the body 200 such that they are spaced apart from each other.

Referring to FIG. 9(a), when the second body 230a is bent upward in the same direction as a screen of the display 151 faces, the first contact portion 214 is deformed to apply pressure to the first sensing unit 500a, and the body 200 receives a user input signal.

In contrast, referring to FIG. 9(b), when the second body 230a is bent downward in a direction that is opposite to a direction the screen of the display 151 faces, the second contact portion 216 is deformed to apply pressure to the second sensing unit 500b, and the body 200 receives the user input signal.

According to another embodiment of the present invention, the mobile terminal 100 has a different arrangement of the sensing unit compared to the above discussed embodiments. Therefore, description of parts identical or similar to the embodiments discussed above will be omitted in the following discussion of other embodiments.

Figure 10:
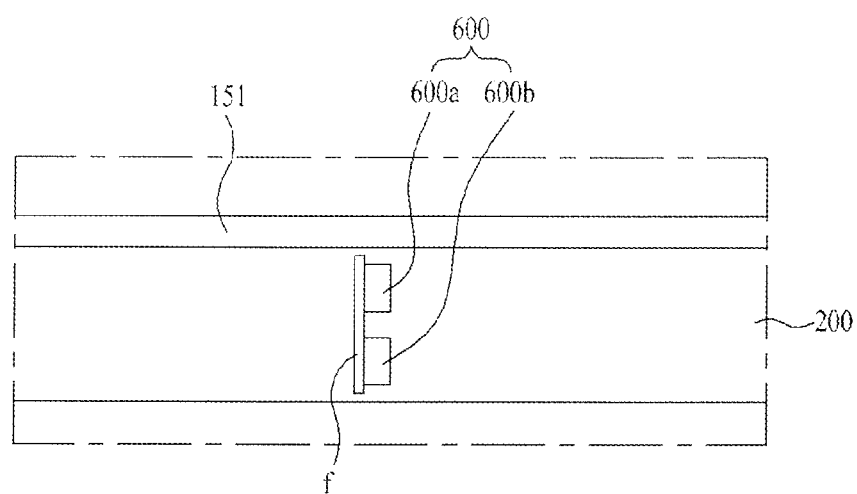
FIG. 10 is a schematic view of a section in a part of a body of a mobile terminal and a sensor in accordance with another embodiment of the present invention.

Referring to FIG. 10, the body 200 is formed of a flexible material such that the entire body is bendable. The body 200 may be formed by injection molding of a synthetic resin such as rubber. A sensing unit 600 is provided in the body 200 such that bending of the body 200 applies compressive force to the sensing unit 600, selectively.

A display 151 is provided to the body 200 such that it can conform with the bending of the body 200. The display 151 is constructed of a flexible display having a flexible screen. The body 200 includes a flexible printed circuit board f formed of a flexible material mounted therein.

The flexible printed circuit board f is extensively disposed in a height direction of the body 200. The sensing unit 600 is provided to the flexible printed circuit board f. The sensing unit 600 includes one pair of a first sensing unit 600a and a second sensing unit 600b provided to the flexible portion of the body 200 spaced apart from each other in the height direction of the body 200.

The sensing unit 600 is placed in the flexible portion of the body 200 such that the flexible portion of the body 200 surrounds the sensing unit 600. Thus, bending of the body 200 generates and transmits compression force or tension directly to the sensing unit 600. Therefore, the body 200 and the sensing unit 600 maintain a close contact state.

Moreover, the one pair of the first sensing unit 600a and the second sensing unit 600b are extended in a height direction of the body 200. Notably, the compression or tension generated in response to the bending of the body 200 formed as a single unit is transmitted in a length direction of the body 200. Therefore, the first sensing unit 600a and the second sensing unit 600b being arranged extensively in the height direction, allows smooth sensing of the compression force or the tension transmitted in the length direction. That is, a sensing portion of the sensing unit 600 is provided to face the length direction of the body 200.

In more detail, the first sensing unit 600a and the second sensing unit 600b are arranged at portions where the tension and compression force is generated in response to the bending of the body 200, respectively. That is, if the body 200 formed of the flexible material is bent to one side, the tension and compression force generated is centered on a reference line, wherein the first sensing unit 600a and the second sensing unit 600b are arranged in directions that are different from each other with reference to the reference line for sensing a change of the tension and compression force, respectively.

Figure 11:
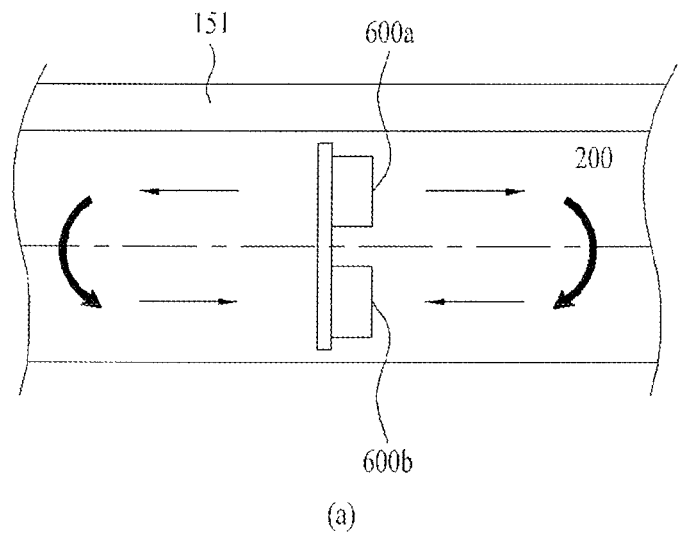
FIGS. 11(a) and 11(b) are schematic views of sections showing pressure changes caused by a change in the body configuration of a mobile terminal in accordance with another embodiment of the present invention.
Figure 11:
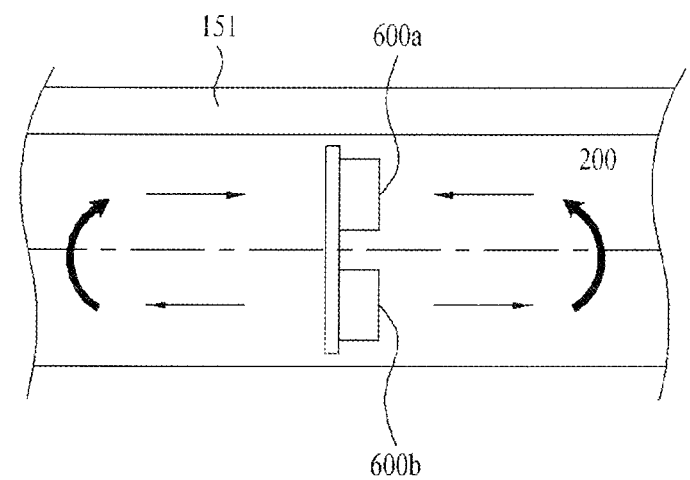

Referring to FIG. 11(a), if the body 200 is bent in a direction that is opposite to a direction a screen of the display 151 faces, tension is generated at the first sensing unit 600a arranged adjacent to the display 151, and compression force is generated at the second sensing unit 600b arranged farther from the display 151 relatively, such that the body 200 can receive the user's signal accordingly.

Referring to FIG. 11(b), if the body 200 is bent in the same direction as a direction of a screen of the display 151 faces, compression force is generated at the first sensing unit 600a arranged adjacent to the display 151, and tension is generated at the second sensing unit 600b arranged relatively farther from the display 151 such that the body 200 can receive the user's signal accordingly.

Thus, a direction of bending of the body 200 is recognized by a pressure change sensed at the one pair of the first sensing unit 600a and the second sensing unit 600b, and the magnitude of force can also be measured by a change of the pressure.

Moreover, in order to make more sensitive measurement, pressure may be applied to the sensing unit 600 at an initial stage. In this instance, the pressure is reduced at a portion of the body 200 on which the tension acts.

Therefore, if the sensing unit 600 is provided to a center portion of the body 200, a bending direction of the body 200 and intensity thereof are measurable. Further, if the sensing unit 600 is provided to a particular portion of the body 200, such as a corner, a direction and intensity of the movement in a particular direction are also measurable.

Figure 12:
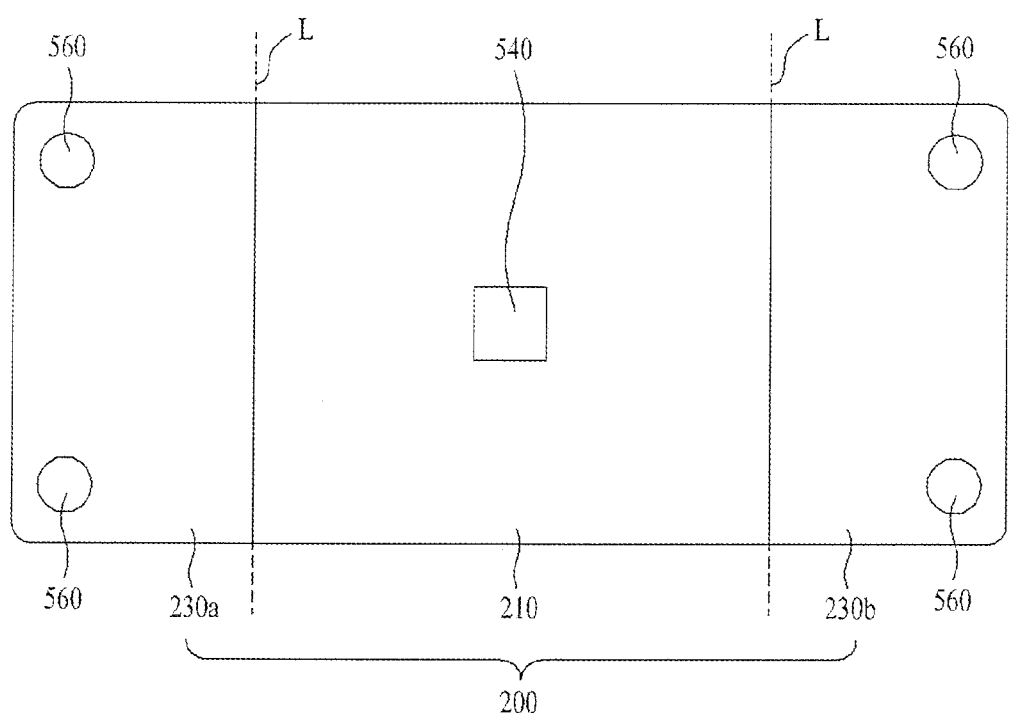
FIG. 12 is a schematic plan view showing arrangement of sensing units in a mobile terminal in accordance with an embodiment of the present invention.

Referring to FIG. 12, as described before, the sensing units 540 and 560 may include a proximity sensor, a pressure sensor, or an acceleration sensor. In this embodiment, the sensing units 540 and 560 are motion sensors and detect relative position changes caused by bending of the body 200. That is, the sensing unit includes a first motion sensor 540 for sensing a position of the body 200, and a second motion sensor 560 for sensing a position change relative to the first motion sensor 540.

The first motion sensor 540 is arranged at a substantially central portion of the body 200, and the second motion sensor 560 is arranged at one or more corner portions of the body 200, each motion sensor being spaced apart from each other. The first motion sensor 540 detects spatial coordinates of an absolute position of the body 200, and the second motion sensor 560 detects a position of the second motion sensor 560 relative to the first motion sensor 540, to sense whether the body 200 has been deformed or not. Therefore, the second motion sensor 560 is arranged at a portion that can be deformed with reference to the position at which the first motion sensor 540 is arranged.

The first motion sensor 540 and the second motion sensor 560 detect at least one of geomagnetism, acceleration, tilting or angular acceleration for sensing a relative position change. In this embodiment, the first motion sensor 540 and the second motion sensor 560 may be geomagnetic sensors which measure intensity of the geomagnetism for detecting an angle of azimuth, or acceleration sensors which measure acceleration of a moving object or intensity of an impact.

The first motion sensor 540 and the second motion sensor 560 may include a three axis geomagnetic sensor which senses a rotation direction by using an absolute direction of the North Pole and a three axis acceleration sensor which senses increase or decrease of acceleration of gravity. The three axis geomagnetic sensor detects intensity of magnetic fields in three axial directions perpendicular to one another, and the three axis acceleration sensor detects acceleration in three axial directions.

Accordingly, if the first motion sensor 540 is provided to the first body 210, and the second motion sensor 560 is provided to the second body 230 which can be deformed with respect to the first body 210, the first motion sensor 540 detects spatial absolute coordinates of the first body 210, and the second motion sensor 560 detects coordinates relative to the first motion sensor 540. In this embodiment, if the second body 230 is deformed with respect to the first body 210, coordinates of the second motion sensor 560 relative to the first motion sensor 540 are changed, and the controller 180 senses such relative position change of the first motion sensor 540 and the second motion sensor 560 to receive the same as a user input signal.

Figure 13:
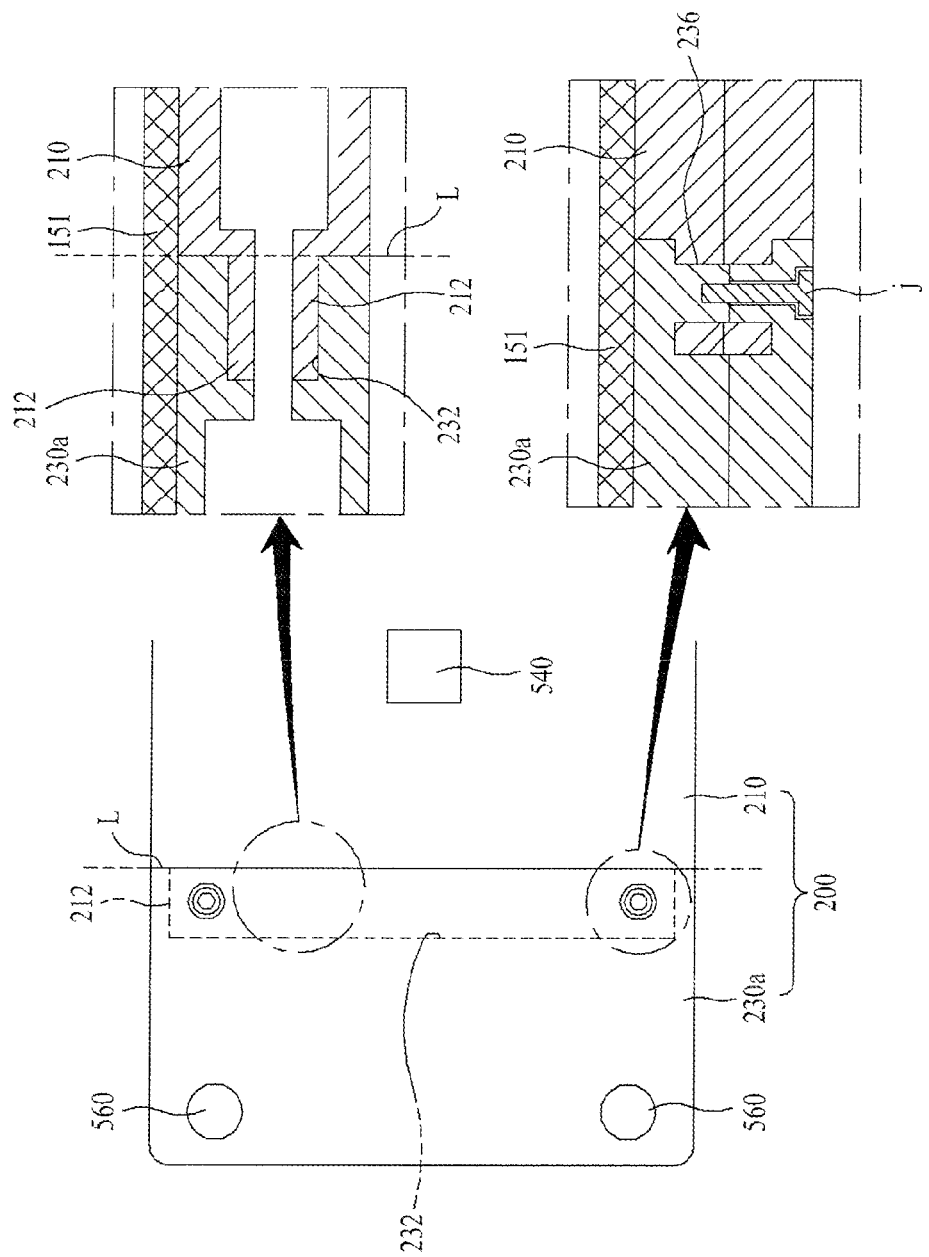
FIG. 13 is a schematic view of sections showing a plurality of coupling structures in a body of a mobile terminal in accordance with another embodiment of the present invention.

Referring to FIG. 13, both the first body 210 and the second body 230*a* are bendable. In this embodiment, the first body 210 is formed of the rigid material and the second body 230*a* is formed of the flexible material.

The first body 210 and the second body 230*a* have the coupling rib 212 and the coupling slot 232 formed in conformity with each other for coupling to each other. The coupling slot 232 has a lengthy extension along a coupling surface L of the first body 210 and the second body 230*a*, and the coupling rib 212 is provided such that it can be placed in and coupled to the coupling slot 232.

The first body 210 includes the coupling rib 212 to be placed in the second body 230*a*. The coupling rib 212 is extended along the length of a coupling surface of the first body 210 and the second body 230*a*. That is, the coupling rib 212 is projected toward the second body 230*a* along one side circumference of the first body 210.

In this embodiment, the coupling rib 212 is positioned at the first body 210 on a side of the second body 230*a* with reference to the contact surface L, and the second body 230*a* is not positioned on a side of the first body 210 with reference to the contact surface L. If the second body 230*a* is not projected toward the first body 210 with reference to the contact surface L, the second body 230*a* is not deformed when the second body 230*a* is coupled to the first body 210 due to a small contact surface of the second body 230*a* to the first body 210.

The body 200 includes a fastening boss 236 provided thereto which passes through the coupling rib 212 that is placed in the coupling slot 232 from the first body 210 or the second body 230. At least two fastening bosses 236 may be provided spaced apart from each other, and a fastening force thereof may be maintained by a fastening piece j which passes through the fastening boss 236.

Figure 14:
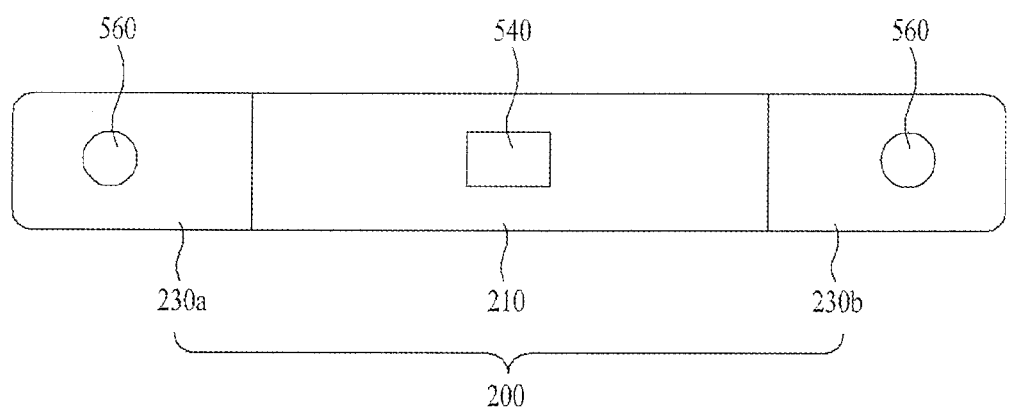
FIGS. 14 and 15 are schematic views of sections for showing a displacement of a sensing unit caused by a change of the body configuration of a mobile terminal in accordance with an embodiment of the present invention.
Figure 15:
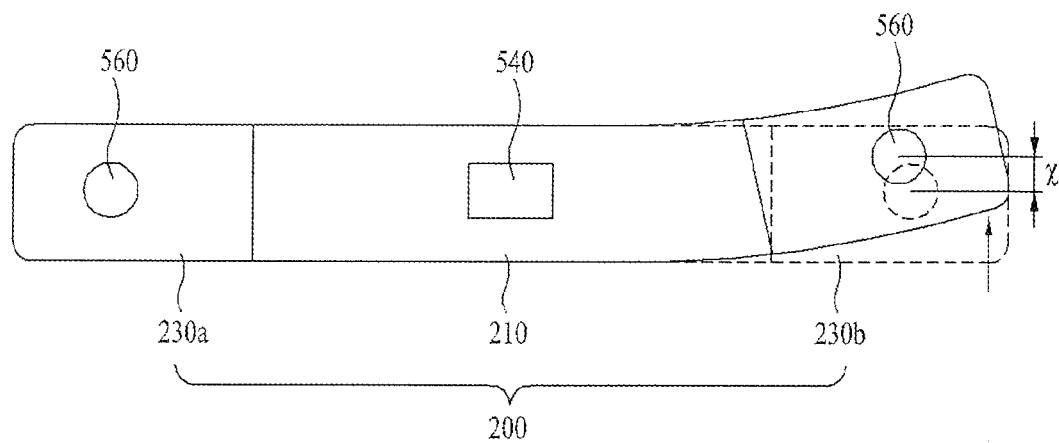

Referring to FIGS. 14 and 15, the mobile terminal 100 has a bendable body 200 such that bending or twisting of a corner or an edge portion of the body 200 generates a user input signal for operating the mobile terminal 100.

In this embodiment, the first motion sensor 540 is provided to the first body 210, and the second motion sensor 560 is provided to the second body 230*a*/230*b*. The first motion sensor 540 detects spatial coordinates of an absolute position of the first body 210, and the second motion sensor 560 detects a position of the second motion sensor 560 relative to the first motion sensor 540, to sense if the body 200 is deformed or not.

Referring to FIG. 14, the first motion sensor 540 and the second motion sensor 560 detect at least one of geomagnetism, acceleration, tilting or angular speed when the body 200 is not bent for detecting spatial coordinates of the first body 210 and the second body 230.

Referring to FIG. 15, when the body 200 is bent by external force, the second body 230*b* is deformed with respect to the first body 210 and a position of the second motion sensor 560 is changed. That is, if a position of the second motion sensor 560 changes with respect to the first motion sensor 540, the controller 180 senses a displacement of the second motion sensor 560, and recognizes the same as a user input signal to perform a preset operation.

Notably, the reason for setting the first motion sensor 540 as a reference sensor to detect a relative position of the second motion sensor 560 is to prevent a situation where if only the second motion sensor 560 is provided, while the second motion sensor 560 may sense deformation of the body 200, the second motion sensor 560 may also sense movement of the body 200 in the same manner, and thus induce an error.

Hence, if the first motion sensor 540 is set to be a reference sensor to detect the relative position between the second motion sensor 560 and the first motion sensor 540, the controller 180 can distinguish between the movement of the body 200 and the bending of the body 200.

The operation of the mobile terminal 100 including the aforementioned sensing units 500, 540 and 560 will be described with reference to the attached drawings, in detail.

Figure 16:
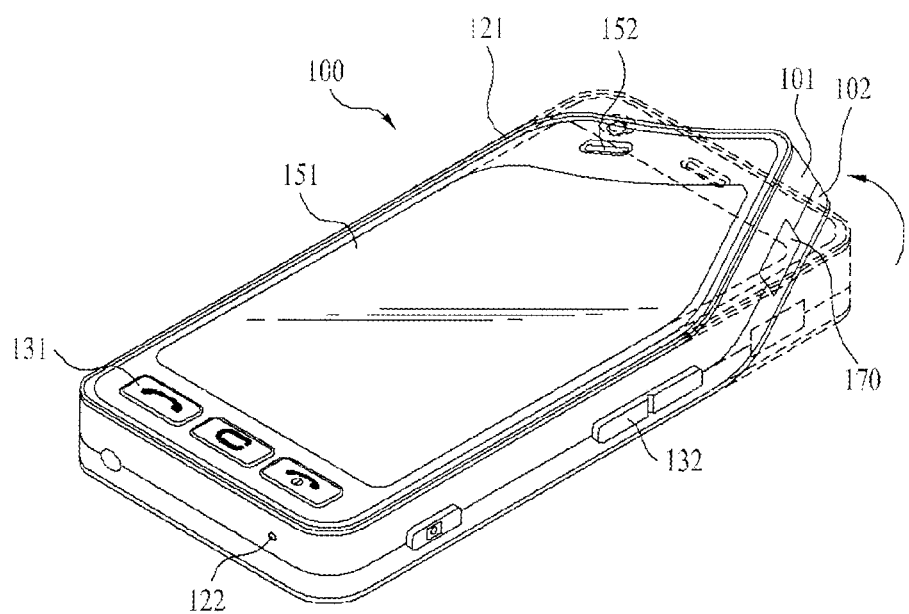
FIG. 16 is a perspective view of a mobile terminal in accordance with an embodiment of the present invention, wherein the configuration of a body of the mobile terminal can be changed.

Referring to FIG. 16, the mobile terminal 100 has a bendable body 200 such that bending or twisting of a corner or an edge portion of the body 200 generates a user input signal for operating the mobile terminal 100.

If the body 200 can be deformed physically, and the sensing units 500, 540 and 560 discussed above (not shown in FIG. 16) are provided for sensing a physical change of the body 200, the user input signal can be intuitively transmitted without using the key pad or the touchscreen type display.

Moreover, since the compressive force or the tension generated by bending the body 200 can be sensed as the user input signal, or the relative position change of the one pair of the sensing units 540 and 560 generated by bending the body 200 can be sensed as the user input signal, the mobile terminal 100 can be utilized to the maximum and the user's interest can be induced in a game or a menu centered on a user interface. Thus, if the physical deformation of the body 200 can be sensed as a user input signal, the operation of the mobile terminal 100 can be controlled in a variety of ways.

Figure 17:
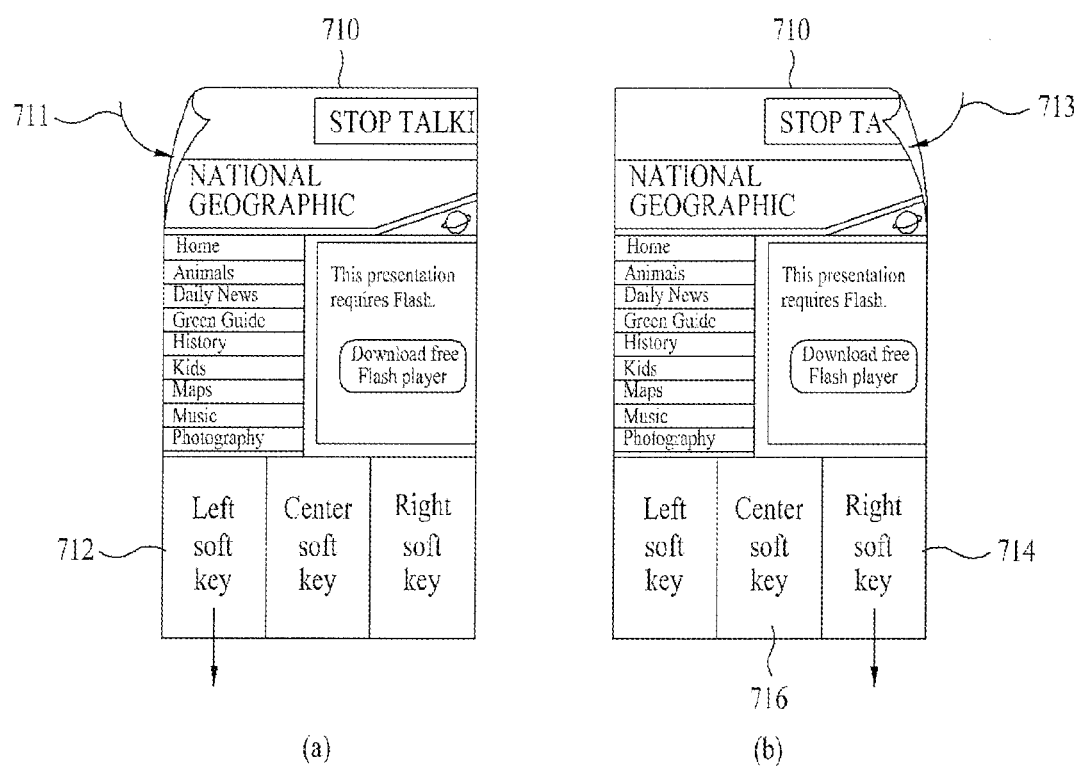
FIGS. 17(a)-(b) and 18(a)-(c) illustrate generating inputs for manipulating an operation control menu in response to changes of the body configuration of a mobile terminal in accordance with an embodiment of the present invention.

FIGS. 17(*a*)-18(*c*) illustrate controlling an operation control menu by deforming a body of a mobile terminal in accordance with an embodiment of the present invention. Referring to FIG. 17(*a*), if an upper left side corner of the mobile terminal 100 is bent 711, a menu item 712 shown on a lower left side of the display 151 can be selected. Accordingly, the menu item selected 712 may be put into operation in response to the deformation of the body of the mobile terminal 100.

Similar to FIG. 17(*a*), referring to FIG. 17(*b*), if an upper right side corner of the mobile terminal 100 is bent 713, a menu item 714 shown on a lower right side of the display 151 can be selected. Further, the menu item 716 shown at the lower center of the display 151 may be selected when an upper middle portion of the mobile terminal 100 is bent. In this case, depending on the direction of the bending, for example, forward or backward, a different input may be received by the mobile terminal 100.

Figure 18:
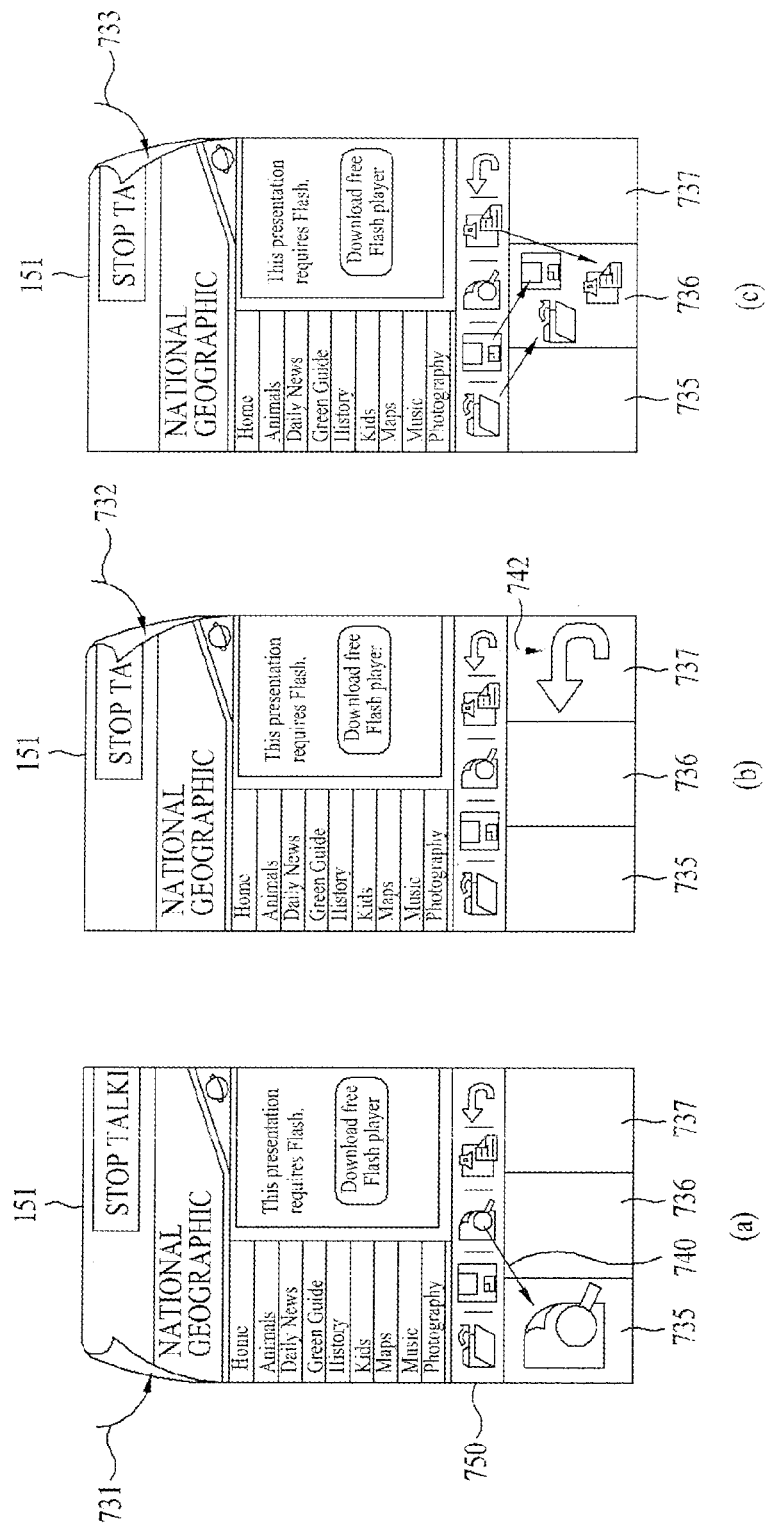

Referring to FIG. 18(*a*), a menu item 735 to be selected when an upper left side corner of the mobile terminal 100 is bent 731 may be preset by selecting the menu item 735 from a list of menu items 750. For example, the menu item 735 can be selected in response to a touch and drag input 740. Referring to FIG. 18(*b*), a menu item 737 to be selected when an upper right side corner of the mobile terminal 100 is bent 732 may be preset in response to a touch and drag input 742. Referring to FIG. 18(c), the menu item 736 to be selected when the mobile terminal 100 is bent may be set to be more than two menu items. In this case, the menu item to be executed in response to the bending of the mobile terminal 100 may be displayed as a message asking for a user's selection.

Figure 19:
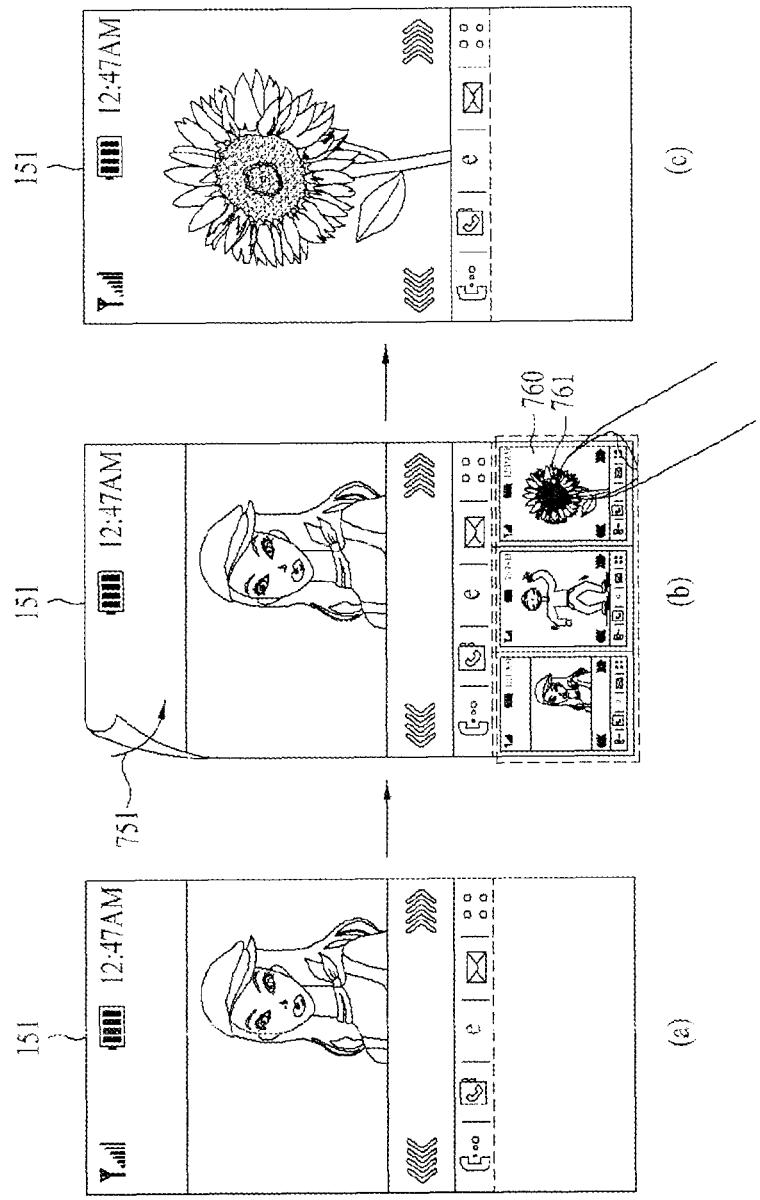
FIGS. 19(a)-(c) illustrate generating inputs for manipulating an operation control menu in response to changes of the body configuration of a mobile terminal in accordance with another embodiment of the present invention.

Referring to FIGS. 19(a) and 19(b), if one side of the mobile terminal 100 is bent 751 when an operation screen is displayed on the display 151, an operation control menu 760 is displayed on the display 151. When one of the displayed menu items is selected from the operation control menu 760 by a touch input 761, an operation corresponding to the touched menu item is executed. For example, as shown in FIG. 19(c), an image is displayed on the display 151 in response to the touch input 761 selecting a thumbnail image of the displayed image. While the operation control menu 760 is displayed in response to the bending in this embodiment, various operations may be controlled by bending the mobile terminal 100 having the body 200 formed of the flexible material.

Figure 20:
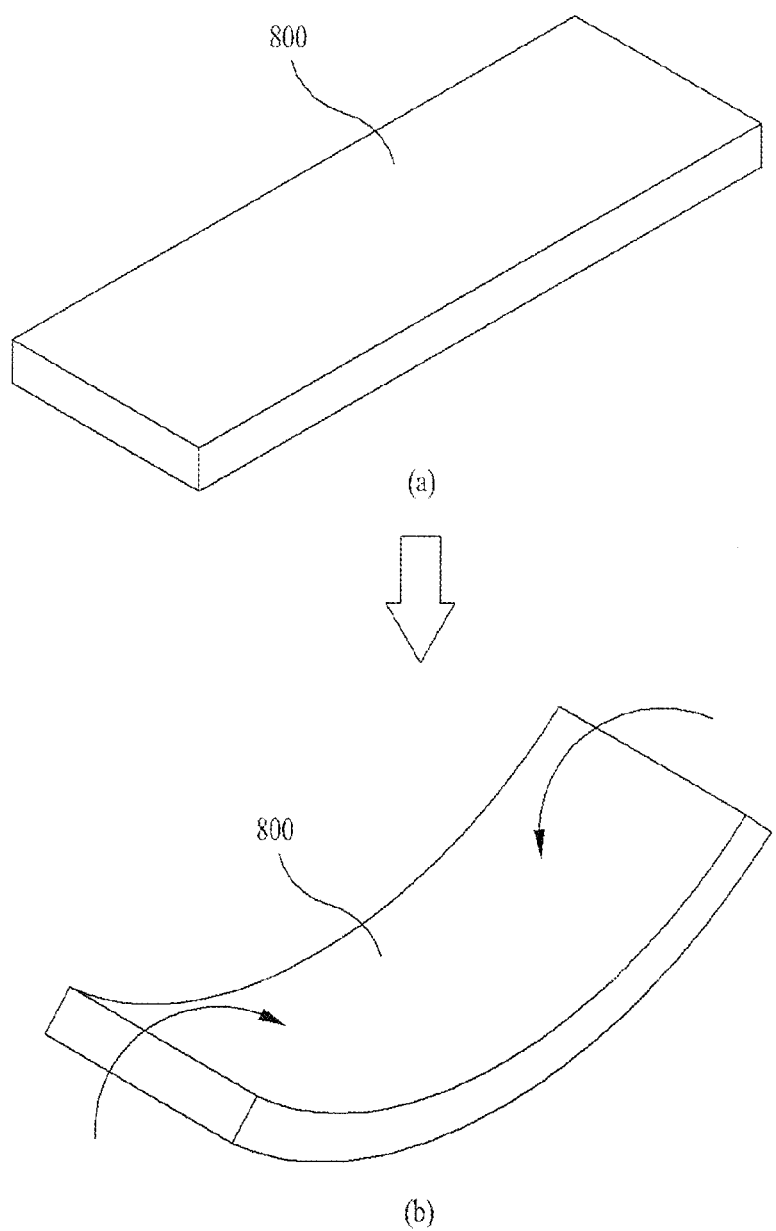
FIGS. 20(a) and 20(b) illustrate an operation process of an actuator of a mobile terminal in accordance with an embodiment of the present invention, wherein the body configuration of the mobile terminal can be changed.

FIGS. 20(a) and 20(b) illustrate an operation of an actuator of the mobile terminal 100 in accordance with another embodiment of the present invention. Referring to FIGS. 20(a) and 20(b), a shape memory alloy 800 of an actuator may be a metal alloy that can return to its original shape. For example, the alloy can be deformed at a temperature below a transition temperature, and eventually return to its original shape prior to deformation at temperature above the transition temperature. The transition temperature may be a fixed temperature at which the transition or change occurs.

Accordingly, the shape memory alloy 800 can be fabricated to memorize a bent shape and to maintain a flat shape such that the shape memory alloy 800 returns to the bent shape when the shape memory alloy 800 reaches a temperature above a certain temperature by applying heat thereto. The shape memory alloy 800 can convert thermal energy into mechanical energy such as displacement or power, and includes properties such as a shape memory effect, a vibration attenuation characteristic, a super elastic effect and an excellent anti-corrosive characteristic.

The shape memory effect is a property in which, while the shape memory alloy 800 is deformed at a low temperature below a critical point, the shape memory alloy 800 returns to an original shape if the shape memory alloy 800 is heated to a higher temperature. The vibration attenuation characteristic, which is best shown at a low temperature phase (Martensite) of the shape memory alloy, emits a non-metallic sound, such as a dead sound or "thud" sound similar to rubber if the shape memory alloy is dropped from a certain height and in the low temperature phase. The super elastic effect is a characteristic in which, while the shape memory alloy 800 is deformed at a high temperature phase (Austenite), if the external force is removed from the shape memory alloy, the shape memory alloy 800 returns to an original shape.

The shape memory alloy 800 may be sorted as a nickel group Ni, a copper group Cu, an iron group Fe, and other kinds thereof, such as Cu—Zn—Ni, Cu—Al—Ni, Ag—Ni, and Au—Cd which are combinations of metals including zinc Zn, aluminum Al, gold Au and silver Ag. However, a shape memory alloy 800 having the best memory may be nickel-titanium Ni—Ti alloy.

An alloy formed by mixing nickel and titanium at a ratio of 1:1 in numbers of atoms is referred to as Nitinol. Nitinol has a unique characteristic in which a crystalline structure changes with a temperature change. While an atomic structure of Nitinol changes easily at a low temperature, the atomic structure of Nitinol becomes harder and does not change at a high temperature. Nitinol can be formed to show the shape memory effect within a wide temperature range of −400° F. (−240° C.)~212° F. (100° C.).

The crystalline structure of Nitinol has an internal structure having a repetition of a few million crystal units each with a unique shape and unique angles. Most metal alloys have internal structures each of which is not influenced from a certain extent by temperature change. If heat is applied thereto, though atoms therein vibrate at a higher speed, enabling to bend or change a shape thereof by applying external force, a molecular structure thereof does not change.

In contrast, the shape memory alloy 800 may include two stable crystalline structures which change according to temperature. The temperature change can change one crystalline structure to another crystalline structure. A critical temperature at which such a change takes place varies with composition and kinds of the alloy metal.

The atoms in Nitinol are arranged in a face centered cubic lattice in which one atom is arranged at each of eight corners and at a center of each of six faces in a die form at a high temperature. If the Nitinol is cooled, the arrangement of the atoms changes at a certain temperature suddenly from the die shape of arrangement to a body centered cubic lattice in which, though the atoms at the 8 corners stay as they were, the atom at each of the six faces are positioned at a center of the die. The crystalline structure change from the face centered cubic lattice to the body centered cubic lattice with a temperature change provides the shape memory effect to the shape memory alloy.

Figure 21:
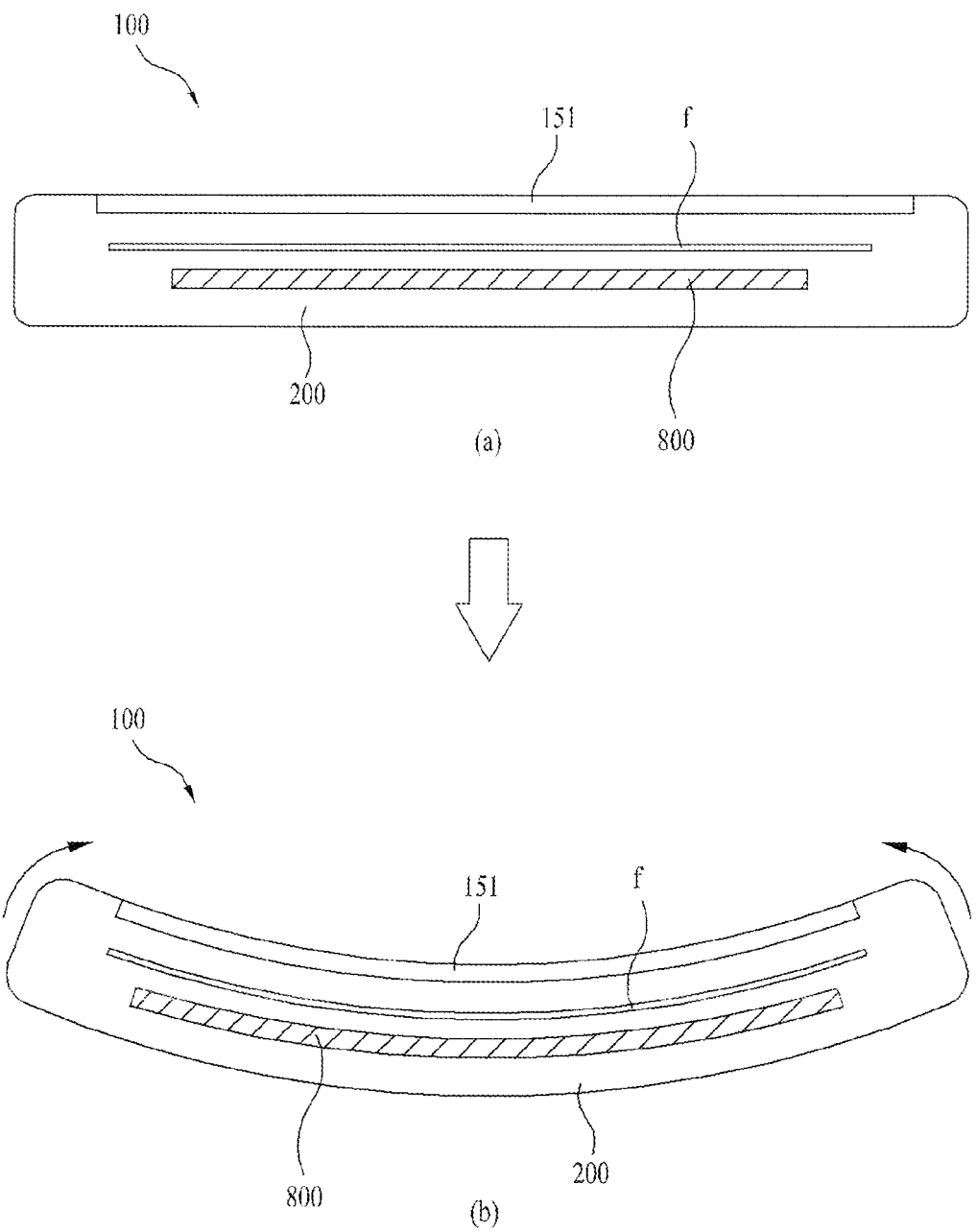
FIGS. 21(a) and 21(b) are schematic views of sections showing a body of a mobile terminal in accordance with an embodiment of the present invention, wherein the body configuration of the mobile terminal can be changed.
Figure 22:
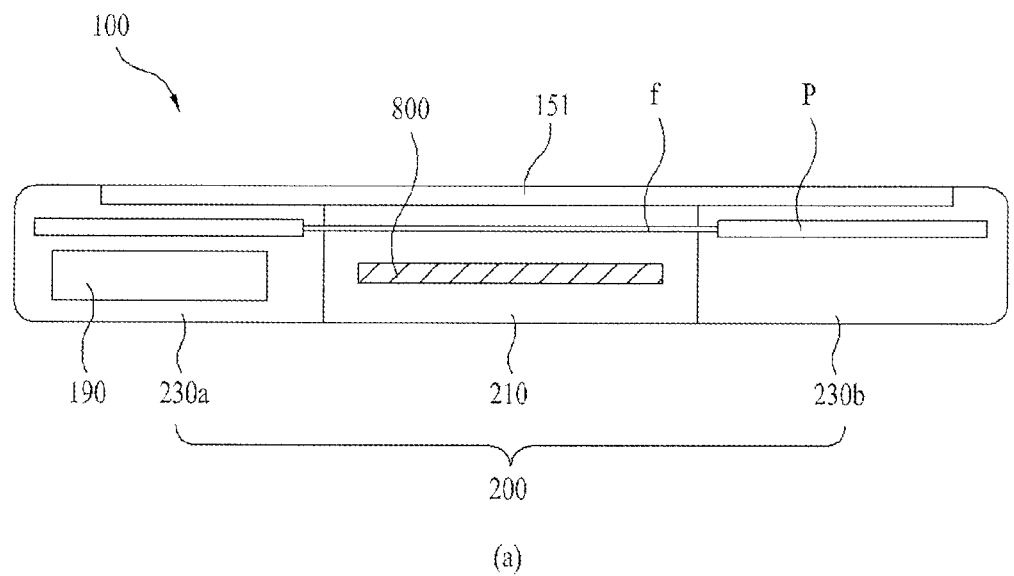
FIGS. 22(a)-(b) and 23(a)-(b) are schematic views of sections showing a body of a mobile terminal in accordance with another embodiment of the present invention, wherein the body configuration of the mobile terminal can be changed.
Figure 22:
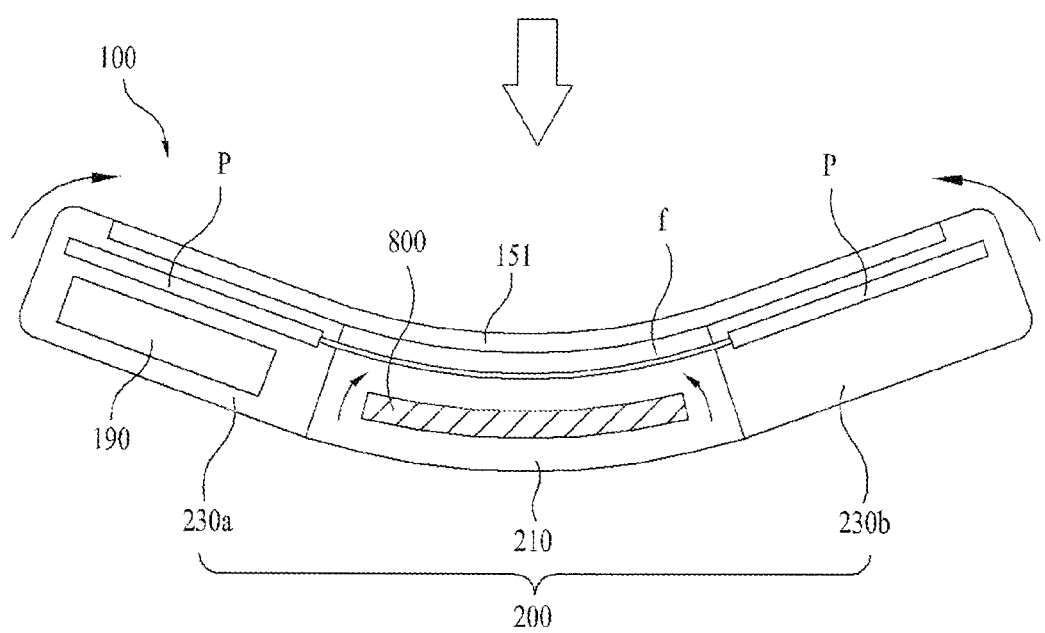
Figure 23:
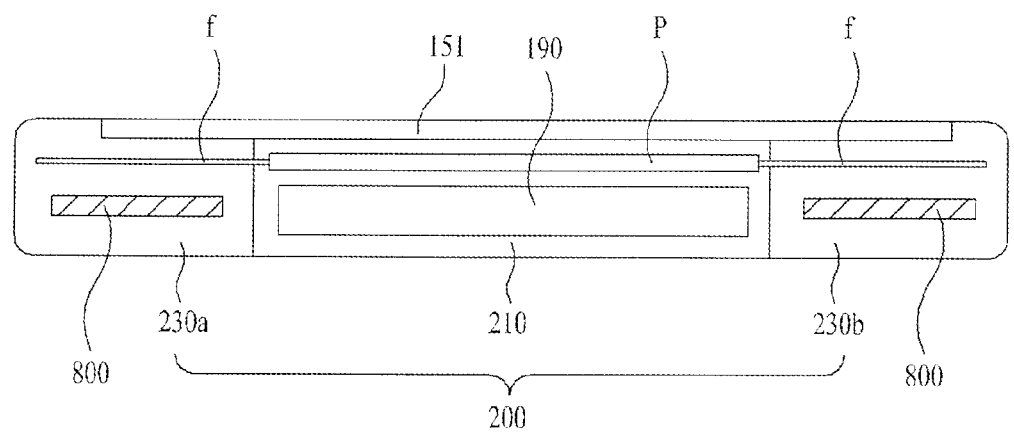
Figure 23:
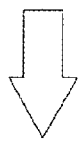
Figure 23:
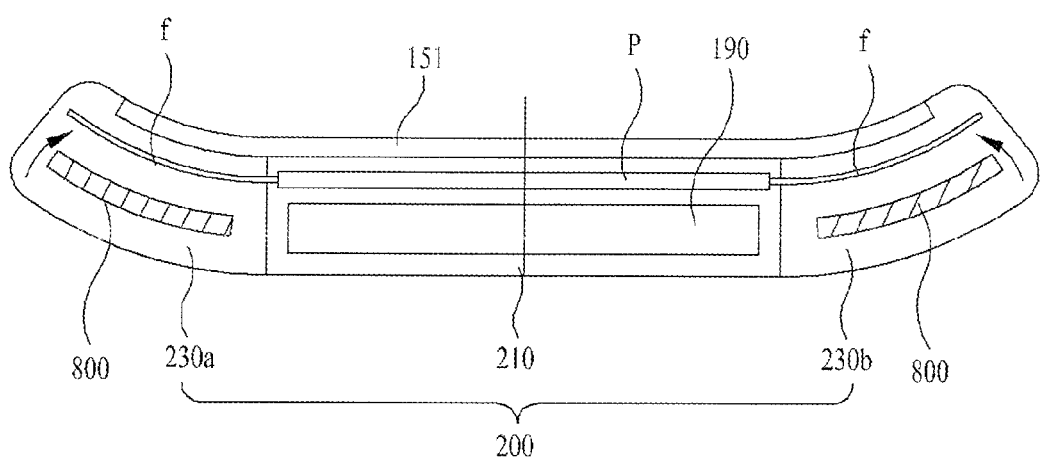

FIGS. 21(a) and 21(b) illustrate a section of a body of the mobile terminal 100 and a change thereof in accordance with an embodiment of the present invention. Referring to FIG. 21(a), the mobile terminal 100 includes a body 200 formed of materials at least some of which can deform elastically, a display 151 provided to the body 200 for displaying an image, and an actuator provided in the body 200 for changing a shape thereof upon receiving an electric signal applied thereto selectively to change a shape of the body 200.

The display 151 is constructed of a flexible display which can be bent in conformity with the bending of the body 200. The flexible display is a flexible screen which can be rolled at the end. The flexible display is configured to provide flexibility such that the display 151 can be folded or unfolded.

A general printed circuit board P (not shown) and a flexible printed circuit board f can be mounted in the body 200, selectively. That is, at parts of the body 200 formed of the flexible material, the flexible printed circuit board f is provided, at parts of the body 200 formed of a rigid material, the printed circuit board P is provided, and at a boundary of the flexible portion and the rigid portion, the flexible printed circuit board f is arranged.

In this embodiment, the body 200 is formed of an elastic material, and the actuator is formed of the shape memory alloy 800 which alternates between an original shape and a deformed shape according to a temperature change. The shape memory alloy 800 is placed in the body 200 such that the shape change of the shape memory alloy 800 also changes the shape of the body 200. The shape memory alloy 800 changes a shape thereof as an electric signal provided thereto generates heat generated in response to internal resistance.

For example, the shape memory alloy 800 is connected to the controller 180 electrically such that the controller 180 provides the electric signal to the shape memory alloy 800, selectively. Once the electric signal is transmitted to the shape memory alloy 800, the heat is generated at an inside thereof, to change an internal temperature of the shape memory alloy 800 to change the shape of the shape memory alloy 800, at the end. That is, the shape memory alloy 800 converts the electric signal into thermal energy by electric resistance, and the thermal energy changes the crystalline structure of the shape memory alloy 800, thereby changing the shape of the shape memory alloy 800.

The shape memory alloy 800 has a fixed width that is extended in a length direction of the body 200. Moreover, the shape memory alloy 800 has a plate shape extended from one end to the other of the body 200.

The shape memory alloy 800 having the plate shape with the fixed width provides a surface area thereto such that the shape change of the shape memory alloy 800 causes deformation of the body 200. And, the shape memory alloy 800 extended in the length direction of the body 200 uses energy generated as the shape memory alloy 800 undergoes the shape change in changing an outside shape thereof without being absorbed by the body 200. Notabley, if a force is applied to objects of identical material, an object longer than the other is deformed easily.

Moreover, it is preferable that the shape memory alloy 800 changes from a flat shape to a bent shape when an internal temperature thereof exceeds the transition temperature. Accordingly, the shape memory alloy 800 is configured to memorize a bent shape and a curved shape, and when the shape memory alloy 800 is mounted in the body 200, the shape memory alloy 800 is mounted in a flat shape. Thus, the shape memory alloy 800 maintains the flat shape in an ordinary state, and returns to the original curved shape when the internal temperature of the shape memory alloy 800 exceeds the transition temperature due to the electric signal.

Referring to FIGS. 22(a)-23(b), although the body 200 has frames and other components built in the front and rear cases 101 and 102, the body 200 is not distinctive from the front and rear cases 101 and 102 combined. That is, the body 200 may be considered as part of a whole structure of the mobile terminal 100 including the front and rear cases 101 and 102, the frame and other components that form an internal structure of the front and rear cases 101 and 102.

Because the body 200 is flexible, when at least some portions of the body 200 are formed of an elastic material and exposed to an outside of the body 200, or separate front and rear cases 101 and 102 are provided depending on the design of the mobile terminal 100, the front and rear cases 101 and 102 are also formed of the elastic material such that the body 200 is enabled for deformation.

In this embodiment, the body 200 may include a first body portion 210 and at least one second body portion 230a/230b flexibly coupled to the first body portion 210. Although the second body portion 230 may include a second body portion 230a provided at one side of the first body portion 210, and a second body portion 230b provided at the other side of the first body portion 210, the second body portion 230a and the second body portion 230b may not be distinctive in their structure and function.

In one aspect of the present invention, one of the first body portion 210 and the second body portion 230a/230b is formed of a flexible material, and the other body portion is formed of a rigid material. For example, if the first body portion 210 is formed of the flexible material, the second body portion 230a/230b is formed of the rigid material. Alternatively, depending on the design, both the first body portion 210 and the second body portion 230a/230b may be formed of the flexible material as a single unit.

Since the coupling structure of the first body portion 210 and the second body portion 230a/230b is identical to the foregoing embodiment described with reference to FIGS. 6 to 9(b), detailed description of the coupling structure will be omitted.

Referring to FIGS. 22(a) and 22(b), the first body portion 210 may be formed of the flexible material, and the second body portion 230a/230b may be formed of the rigid material. In this instance, the flexible printed circuit board f is provided to the first body portion 210, and the printed circuit board P and the battery 190 may be provided to the second body portion 230a/230b.

That is, the flexible printed circuit board f that is suitable for bending is applied to the first body portion 210 formed of the flexible material, and the printed circuit board P that is not bendable and stiff, and the battery 190 that requires security are applied to the second body portion 230a/230b.

In this embodiment, the display 151 constructed of the flexible display is arranged at one side of the body 200. The display 151 may be provided to the first body portion 210 and the second body portion 230a/230b respectively, or depending on the design, the display 151 may be provided only to the first body portion 210 or the second body portion 230a/230b.

In order to deform the body 200, the shape memory alloy 800 is placed in a flexible portion of the body 200. In FIGS. 22(a) and 22(b), the shape memory alloy 800 is placed in the first body portion 210 formed of the flexible material.

If an electric signal is applied to the shape memory alloy 800 when the shape memory alloy 800 is mounted to the first body portion 210, heat is generated in the shape memory alloy 800 due to to electric resistance, and when the heat elevates an internal temperature, the shape memory alloy 800 is deformed to the curved shape memorized by the shape memory alloy 800, as shown in FIG. 22(b).

In this embodiment, the shape memory alloy 800 is bent to a concave shape, both ends of the shape memory alloy 800 being raised such that the first body portion 210 is also bent accordingly and causing the second body portion 230a/230b coupled to the first body portion 210 to change its position according to the bending direction of the first body portion 210.

That is, according to the shape change of the first body portion 210, the position of the second body portion 230a/230b is also changed with respect to the first body portion 210, thereby making the body 200 have a curved shape. Since the flexible printed circuit board f and the display 151 are changed in conformity with the deformation of the body 200, no damage is made by the shape change of the body 200.

Referring to FIGS. 23(a) and 23(b), the first body portion 210 may be formed of the rigid material, and the second body portion 230a/230b may be formed of the flexible material. In this embodiment, the printed circuit board P and the battery 190 may be provided to the first body portion 210, and the flexible printed circuit board f may be provided to the second body portion 230a/230b.

In order to deform the body 200, the shape memory alloy 800 is placed in a flexible portion of the body 200. In this embodiment, the shape memory alloy 800 is placed in the second body portion 230a/230b formed of the flexible material.

If an electric signal is applied to the shape memory alloy 800 when the shape memory alloy 800 is mounted to the second body portion 230a/230b, heat is generated in the shape memory alloy 800 due to electric resistance, and when the heat elevates an internal temperature, the shape memory alloy 800 deforms to the curved shape memorized by the shape memory alloy 800.

In this embodiment, the shape memory alloy 800 is bent, both ends of the shape memory alloy 800 being raised, to change the shape memory alloy 800 to a concave shape, and the position of the second body portion 230a/230b is also changed with respect to the first body portion 210, thereby making the body 200 have a curved shape. In this instance, since the flexible printed circuit board f and the display 151 are changed in conformity with the deformation of the body 200, no damage is made by the shape change.

Figure 24:
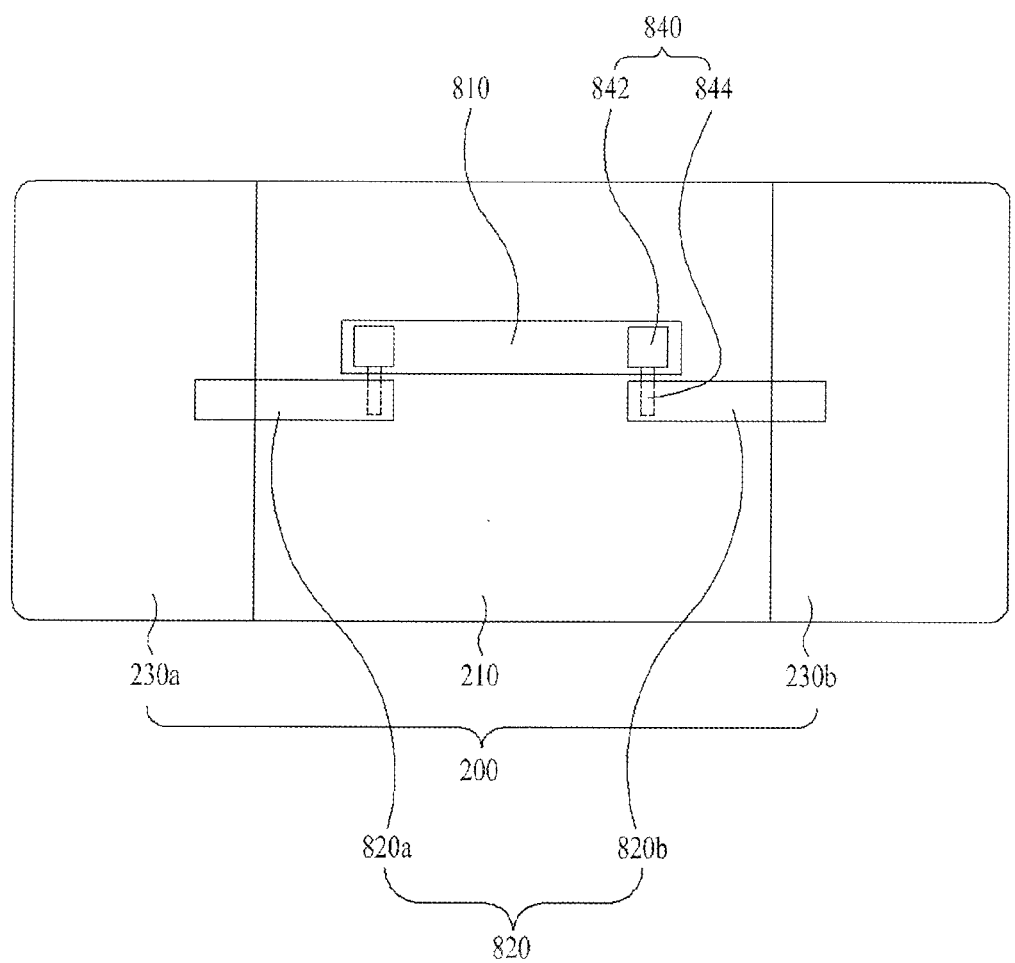
FIG. 24 is a plan view of a body of a mobile terminal and an actuator in accordance with another embodiment of the present invention.

FIG. 24 illustrates an actuator used in the body of the mobile terminal 100 in accordance with another embodiment of the present invention. FIGS. 25(a) and 25(b) illustrate sections of the body of mobile terminal 100 having the actuator in accordance with another embodiment of the present invention.

Figure 25:
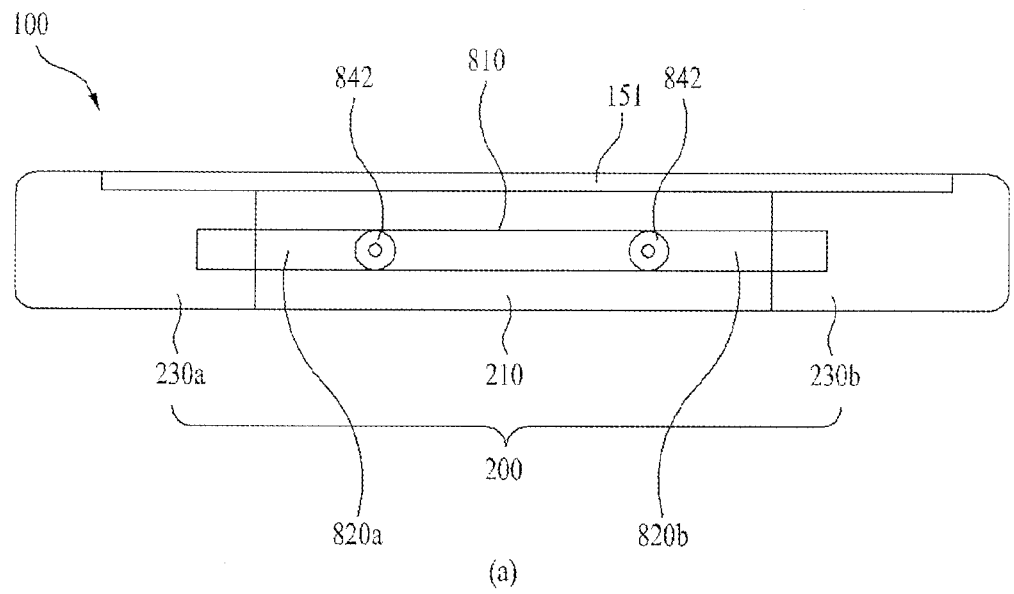
FIGS. 25(a) and 25(b) illustrate an operation process of an actuator of a mobile terminal in accordance with another embodiment of the present invention.
Figure 25:
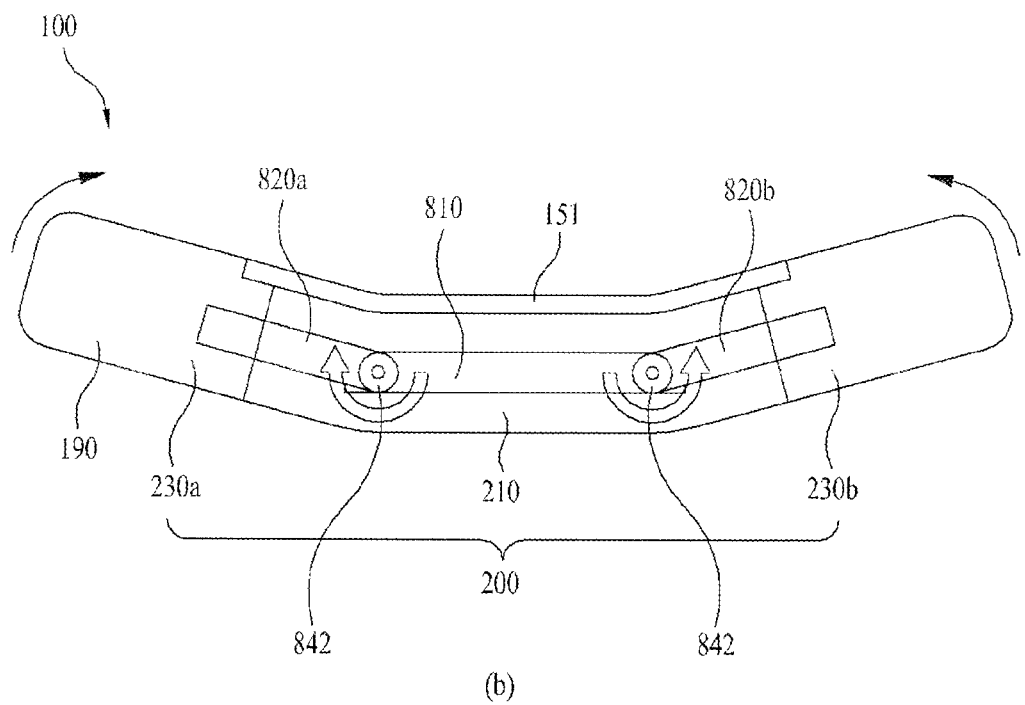

Referring to FIGS. 24-25(b), the body 200 includes a first body portion 210 formed of a flexible material, and at least one second body portion 230a/230b formed of a rigid material and coupled to the first body portion 210. The actuator is provided in the body 200 for changing a shape thereof to deform a shape of the body 200 upon receiving an electric signal provided thereto, selectively.

In this embodiment, the first body portion 210 may be formed of the flexible material, and the second body portion 230a/230b may be formed of the rigid material. The first body portion 210 may have a flexible printed circuit board f provided thereto and the second body portion 230a/230b may have a printed circuit board P and the battery 190 provided thereto.

The actuator according to this embodiment may have a plurality of frames, each of which may be varied in response to the electric signal. Referring to FIG. 24, the actuator may include a motor 840 fixed to the first body portion 210 for providing a driving force thereto, and a movable frame 820 having one end connected to the motor 840 and the other end that is rotated in response to the motion of the motor 840.

The movable frame 820 may include a first movable frame 820a provided to one end of a fixed frame 810, and a second movable frame 820b provided to the other end of the fixed frame 810. However, a number of the movable frames 820 may be configured such that two or more movable frames 820 are provided to opposite sides of the fixed frame 810 to provide a variety of changes at an edge portion of the body 200 depending on design. In this instance, a number of the motors 840 corresponds to a number of the movable frames 820, and each of the motors 840 is individually controllable. In one aspect of the present invention, when no electric signal is provided to the motor 840, the motor 840 is freely rotatable.

Moreover, the actuator may include a fixed frame 810 in the first body portion 210 to have the motor 840 mounted thereto and movably connected to the movable frame 820. Since the fixed frame 810 has two motors 840 that are mounted at opposite ends thereof and rotatable in opposite directions, reaction force from each of the motors 840 can be minimized.

The fixed frame 810 is extended in a length direction of the body 200, and may have opposite ends with the movable frames 820, which are movably provided through the motors 840, connected thereto, respectively. That is, the fixed frame 810 and the movable frame 820 may be provided to the body 200 extended in the length direction thereof. If the fixed frame 810 and the movable frame 820 are arranged extendedly in the length direction thereof, the shape change caused by rotation of the movable frame 820 may be made visually distinctive such that the user can clearly recognize the change of the shape of the body 200.

In more detail, the motor 840 includes a motor body 842 for generating a rotation force and a rotation shaft 844 for transmitting the rotation force to an outside of the motor 840. In this embodiment, the motor body 842 is mounted to the fixed frame 810 fixed to the first body portion 210 or the second body portion 230a/230b, and the rotation shaft 844 is connected to one end of the movable frame 820. Gears engaged with the rotation shaft 844 and the movable frame 820 or friction members at a coupling portion of the rotation shaft 844 and the movable frame 820 may be included for effective transmission of the rotation force.

Referring to FIGS. 25(a) and 25(b), the actuator deforms the body 200 as the motor 840 fixed to the first body portion 210 rotates the movable frame 820, wherein the motor 840 can be fixed to the first body portion 210 directly, or can also be fixed to the first body portion 210 indirectly if the motor 840 is mounted to the fixed frame 810.

For example, the motors 840 generate the driving force when the motors 840 are fixed to the respective opposite ends of the fixed frame 810. The movable frames 820 may be rotatably connected to the motors 840, at the respective opposite ends of the fixed frame 810. Thus, if two motors 840 are mounted to the opposite ends of the fixed frame 810 respectively, vibration from the motors 840 can offset each other. Further, the motors 840 are not mounted to the first body portion 210 individually, but a modularized fixed frame 810 may be mounted to the first body 210 to reduce the time required for assembly.

Thus, as shown in FIG. 25(b), the rotation of the movable frame 820 with respect to the fixed frame 810 changes the shape of the first body portion 210, and the other end of the movable frame 820 connected to the second body portion 230a/230b guides movement of the second body portion 230a/230b. That is, the movable frame 820, mounted to a portion of each of the first body portion 210 and the second body portion 230a/230b, deforms the first body portion 210 when the movable frame 820 rotates, and the second body portion 230a/230b changes its position according to the deformation of the first body portion 210.

In this embodiment, the movable frame 820 changes a position of the second body portion 230a/230b in conformity with the shape change of the first body portion 210 such that no load from weight of the second body portion 230 is placed on a coupling surface of the first body portion 210 and the second body portion 230a/230b. That is, the movable frame 820 changes the shape of the first body portion 210 as well as a position of the second body portion 230a/230b.

Alternatively, although not shown in the drawing, the entire portion of the body 200 may be formed of an elastic material. That is, the body 200 may not be divided into the first body portion 210 and the second body portion 230a/230b, but is constructed as a single unit such that the entire body 200 may be formed to allow elastic deformation.

The body 200 includes the actuator provided thereto, wherein the actuator may include the fixed frame 210 fixed in the body 200, at least one motor 840 having one end fixed to the fixed frame 210 for providing the driving force, and a movable frame 820 in the body 200 rotatably connected to the motor 840. In this embodiment, the motor 840 includes a motor body 842 fixed to the fixed frame 810, and a rotation shaft 844 rotatably provided to the motor body 842 and connected to the movable frame 820.

Figure 26:
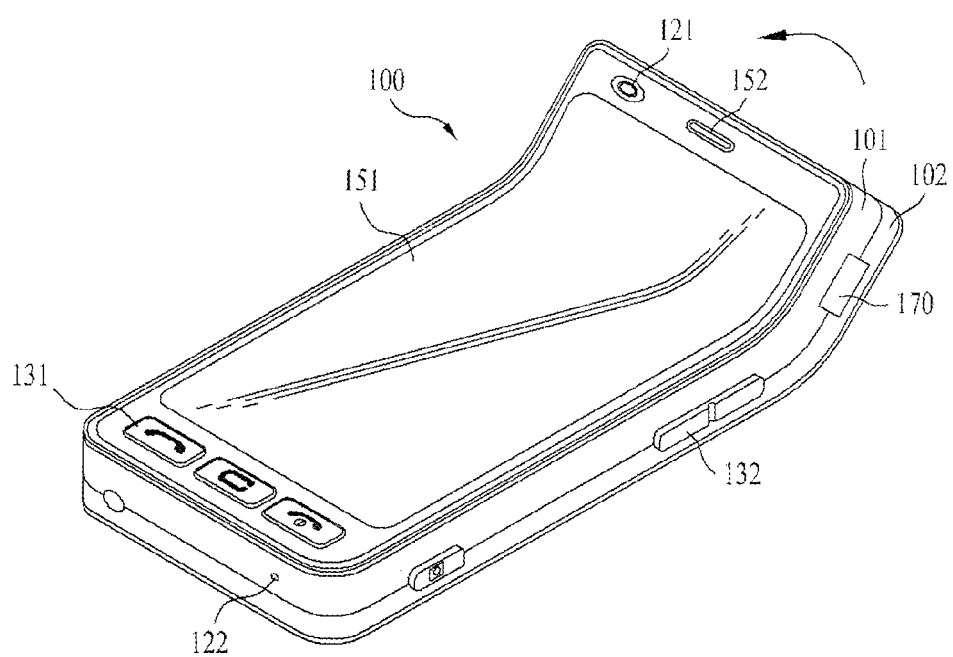
FIG. 26 is a perspective view a mobile terminal in accordance with an embodiment of the present invention, wherein the configuration of a body of the mobile terminal can be changed.

Referring to FIG. 26, the mobile terminal 100 includes deformable frame. Therefore, the shape of the mobile terminal 100 can be deformed physically in response to a signal from the controller 180, and an operation system of the mobile terminal 100 may vary depending on a configuration of the actuator in the body of the mobile terminal 100.

If the actuator is constructed of the shape memory alloy 800 (shown in FIG. 20), when an electric signal is provided from the controller 180 to the shape memory alloy 800, electric resistance takes place in the shape memory alloy 800 to generate heat. Once the temperature of the shape memory alloy 800 is elevated and exceeds the set transition temperature of the shape memory alloy 800, the shape memory alloy 800 returns to a memorized shape due to the shape memory effect of the shape memory alloy 800.

That is, the shape memory alloy 800 is deformed to a curved shape and the shape of the body 200 changes according to the change of the shape memory alloy 800. Thus, if the body 200 changes the shape thereof from a flat shape to a curved shape, the user can recognize a generated signal by visually noticing the shape change of the mobile terminal 100.

After the shape of the body 200 is changed to the curved shape, the user may also apply an external force thereto to deform the body 200 to its original shape or a flat shape. Alternatively, the controller 180 may control the actuator having the motor 840 such that the actuator returns the shape of the body 200 back to its normal configuration.

Moreover, if the actuator includes the fixed frame 810 and the movable frame 820, the controller 180 transmits the electric signal to the motor 840 such that the motor 840 rotates the movable frame 820. If the movable frame 820 rotates, the first body portion 210 formed of the flexible material deforms such that the second body portion 230*a*/230*b* formed of the rigid material and fixed to one end of the movable frame 820 moves in accordance with rotation of the movable frame 820.

If the movable frame 820 rotates in the body 200, a portion of the body 200 is bent to have a curved shape. If the body 200 is changed from the flat shape to the curved shape, the user can visually distinguish a shape change of the body 200 and recognize a signal generated from the mobile terminal 100.

Thus, the mobile terminal 100 can output a notification signal not only by vibration, sound, or display, but also by the change of the shape of the body 200. For example, when the mobile terminal 100 receives a telephone call, the controller 180 may change the shape of the body 200 in response to the call such that the body changes to a curved configuration. In this case, no noise is emitted while the telephone call signal is output. Further, a portion of the mobile terminal 100 may be made to bend when the telephone call is received such that the microphone 122 is placed closer to a mouth of the user during the telephone call conversation, thus improving communication quality.

Moreover, if the mobile terminal 100 has optional menus, when the body 200 is bent at a left side or a right side thereof, a user input signal may be generated by returning one side of the bent body 200 to its original position.

As described above, the mobile terminal according to the present disclosure has the following advantages.

The physically deformable body and the sensing unit which can sense a physical change of the body permits the mobile terminal to generate the user input signal intuitively without using a key pad or touch screen type display.

One pair of the sensing units may be arranged to a portion of the body such that the sensing units detect spatial coordinates caused by a relative movement or displacement of the sensing units when the body is bent and the shape is changed. Therefore, no external user input means needs to be exposed on the body of the mobile terminal, and thus, the mobile terminal may be designed more freely without having any user input means on the outside of the body.

Since the mobile terminal according to the present invention can sense a compression or a tension caused by bending of the body as the user input signal, the mobile terminal can be utilized to induce the user's interest when a menu centered on a game or user interface is used.

Since the mobile terminal has a physically deformable body and an actuator which is mounted in the body and can change the shape of the body in response to an electric signal, the mobile terminal can be designed to provide various kinds of signals depending on various shapes of the body that can be achieved.

Since the mobile terminal according to the present invention can sense a deformation caused by bending of the body as a signal, the mobile terminal can be utilized to induce the user's interest when a menu centered on a game or user interface is used.

Since the mobile terminal according to the present invention is designed to output a signal by changing a shape of the mobile terminal, thus enabling to transmit the signal to the user without causing an environmental noise, the user of the terminal can maintain a comfortable environment surrounding the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a body having a length, a width and a height, the length greater than both the width and the height and extending along a length direction, the width less than the length and greater than the height and extending along a width direction, and the height extending along a height direction,
wherein the body is formed by flexibly coupling a first body portion and at least one second body portion coupled to the first body portion in the length direction, one of the first body portion and the at least one second body portion having a flexible portion;
a pair of coupling slots recessively formed at the at least one second body portion, each of the pair of coupling slots extending inward from a respectively corresponding coupling surface of the first body portion and the at least one second body portion;
a pair of coupling ribs formed at the first body portion, each of the pair of coupling ribs protruding from the respectively corresponding coupling surface toward the at least one second body portion and inserted into a respectively corresponding coupling slot in order to couple the first body portion and the at least one second body portion;
a display unit located on one side of the body that is defined by the width and the length;
a sensing unit configured to sense bending of the body, the sensing unit comprising a first sensor disposed at a first contact portion of the first body portion between one of the pair of coupling slots and one of the pair of coupling ribs and a second sensor disposed at a second contact portion between the other one of the pair of coupling slots and the other one of the pair of coupling ribs,
wherein the first sensor is configured to sense bending of the body when the body is bent upward in a first direction, which is same as a direction that a screen of the display unit faces, such that the first contact portion applies pressure to the first sensor,
wherein the second sensor is configure to sense bending of the body when the body is bent downward in a second direction that is opposite to the first direction such that the at least one second contact portion applies pressure to the second sensor, and wherein the first sensor and the second sensor are spaced apart and aligned along the height direction;
a controller configured to:
control the display unit in response to the bending of the body;
generate first electric signal when the first sensor sense that the body is bent upward; and
generate a second electric signal when the second sensor senses that the body is bent downward,
wherein one of the first body portion and the at least one second body portion is formed of a flexible material that is bendable, and the other one of the first body portion and the at least one second body portion is formed of a rigid material that is not bendable.

2. The mobile terminal of claim 1, wherein the first contact portion and the second contact portion are provided separately to prevent the first contact portion and the second contact portion from contacting each other when the body is bent.

3. The mobile terminal of claim 1, wherein each of the first sensor and the second sensor is located in a flexible portion of the body such that the flexible portion selectively provides compression force to at least the first sensor or the second sensor as the flexible portion is bent.

4. The mobile terminal of claim 3, further comprising a flexible printed circuit board located in the flexible portion and operatively coupled to at least the first sensor or the second sensor.

5. The mobile terminal of claim 1, further comprising:
a first motion sensor configured to sense a position of a portion of the body on which it is located, and
a plurality of second motion sensors each configured to sense a change of a position of a portion of the body on which it is located relative to the first motion sensor.

6. The mobile terminal of claim 5, wherein the first motion sensor is arranged at a substantially central portion of the body, and each of the plurality of second motion sensors is arranged at a different corner portion of the body such that each of the plurality of second motion sensors is spaced apart from each other.

7. The mobile terminal of claim 1, wherein the display unit comprises a flexible display configured to be bent according to the bending of the body.

8. The mobile terminal of claim 1, wherein the controller is further configured to control the display unit to display a specific next image in response to the first or second electric signal.

9. The mobile terminal of claim 1, wherein the controller is further configured to select a menu item in response to the first or second electric signal such that a different menu item is selected based upon a portion of the body that is bent.

10. The mobile terminal of claim 9, wherein the controller is further configured to execute the selected menu item in response to the first or second electric signal.

11. The mobile terminal of claim 1, wherein the controller is further configured to control the display unit to display an operation control menu in response to the first or second electric signal.

12. The mobile terminal of claim 1, further comprising:
an actuator configured to change a shape of the body from a first form to a second form in response to a signal received from the controller.

13. The mobile terminal of claim 12, wherein the actuator comprises:
a motor fixed to a portion of the body for providing a driving force; and
a movable frame having a first end portion connected to the motor for rotating a second end portion of the frame.

14. The mobile terminal of claim 12, wherein the controller is further configured to change the shape of the body from the second form back to the first form when user input is received after the shape of the body has been changed from the first form to the second form or after a preset period of time has passed after the shape of the body has been changed from the first form to the second form if no user input is received within the preset period of time.

15. The mobile terminal of claim 12, wherein the signal is generated when an event occurs at the mobile terminal.

16. The mobile terminal of claim 15, wherein the event comprises receiving a phone call or message.

* * * * *